US009659280B2

(12) United States Patent
Bragdon et al.

(10) Patent No.: US 9,659,280 B2
(45) Date of Patent: May 23, 2017

(54) INFORMATION SHARING DEMOCRATIZATION FOR CO-LOCATED GROUP MEETINGS

(71) Applicant: Microsoft Corporation, Redmond, WA (US)

(72) Inventors: Andrew Bragdon, Redmond, WA (US); Robert DeLine, Seattle, WA (US); Ken Hinckley, Redmond, WA (US); Meredith June Morris, Bellevue, WA (US)

(73) Assignee: MICROSOFT TECHNOLOGY LICENSING LLC, Redmond, WA (US)

(*) Notice: Subject to any disclaimer, the term of this patent is extended or adjusted under 35 U.S.C. 154(b) by 489 days.

(21) Appl. No.: 14/269,070

(22) Filed: May 2, 2014

(65) Prior Publication Data

US 2014/0245190 A1    Aug. 28, 2014

Related U.S. Application Data

(62) Division of application No. 13/278,065, filed on Oct. 20, 2011, now abandoned.

(51) Int. Cl.
*G06F 3/048* (2013.01)
*G06Q 10/10* (2012.01)
*G06F 3/0488* (2013.01)

(52) U.S. Cl.
CPC ......... *G06Q 10/109* (2013.01); *G06F 3/0488* (2013.01); *G06Q 10/1095* (2013.01)

(58) Field of Classification Search
CPC ...... G06F 3/017; G06F 3/0346; G06F 3/0425; G06F 3/011; G06F 3/04883; G06F 3/0304
See application file for complete search history.

(56) References Cited

U.S. PATENT DOCUMENTS

| 6,108,028 | A  | * | 8/2000  | Skarbo ............... G06F 1/3203 348/14.03 |
| 7,036,128 | B1 |   | 4/2006  | Julia et al. |
| 7,119,819 | B1 | * | 10/2006 | Robertson ........... G06F 3/04815 715/738 |
| 7,434,166 | B2 |   | 10/2008 | Acharya et al. |
| 7,995,090 | B2 |   | 8/2011  | Liu et al. |
| 8,312,392 | B2 |   | 11/2012 | Forutanpour et al. |
| 8,413,077 | B2 |   | 4/2013  | Yamamoto et al. |
| 8,452,057 | B2 |   | 5/2013  | Chen et al. |

(Continued)

OTHER PUBLICATIONS

Ballendat et al., "Proxemic Interaction: Designing for a Proximity and Orientation-Aware Environment", Proceedings of the Association for Computing Machinery (ACM) International Conference on Interactive Tabletops and Surfaces (ITS '10), Nov. 7-10, 2010, pp. 121-130, ACM, Saarbrücken, Germany.

(Continued)

*Primary Examiner* — Jeffrey A Gaffin
*Assistant Examiner* — Justin Lee
(74) *Attorney, Agent, or Firm* — Lyon & Harr, LLP; Richard T. Lyon

(57) ABSTRACT

Information sharing between meeting attendees during a co-located group meeting in a meeting space is democratized using a computer that is operating cooperatively with one or more object sensing devices in the meeting space to identify postures formed by the meeting attendees.

20 Claims, 14 Drawing Sheets

(56) References Cited

U.S. PATENT DOCUMENTS

| | | | |
|---|---|---|---|
| 8,555,207 B2 | 10/2013 | Hildreth et al. | |
| 2009/0309846 A1 | 12/2009 | Trachtenberg et al. | |
| 2010/0261466 A1 | 10/2010 | Chang et al. | |
| 2011/0197147 A1* | 8/2011 | Fai | G06F 1/1639 715/753 |
| 2011/0205341 A1 | 8/2011 | Wilson et al. | |
| 2012/0017147 A1 | 1/2012 | Mark | |
| 2012/0192084 A1 | 7/2012 | Dura et al. | |
| 2013/0055143 A1* | 2/2013 | Martin | G06F 3/0425 715/779 |

OTHER PUBLICATIONS

Baudel, et al., "CHARADE: Remote Control of Objects using Free-Hand Gestures", Communications of the Association for Computing Machinery (ACM)—Special issue on computer augmented environments: back to the real world, Jul. 1993, pp. 28-35, vol. 36, Issue 7, ACM, New York, New York.

Biehl, et al., "FASTDash: A Visual Dashboard for Fostering Awareness in Software Teams", Proceedings of the Special Interest Group on Computer Human Interaction (SIGCHI) conference on Human factors in computing systems (CHI '07), Apr. 28-May 3, 2007, pp. 1313-1322, Association for Computing Machinery (ACM), San Jose, California.

Bier, et al., "Toolglass and magic lenses: the see-through interface", Proceedings of the 20th annual conference on Computer graphics and interactive techniques (SIGGRAPH '93), Aug. 1993, pp. 73-80, Association for Computing Machinery (ACM), Anaheim, California.

Bolt, ""Put-That-There": Voice and Gesture at the Graphics Interface", Proceedings of the 7th annual conference on Computer graphics and interactive techniques (SIGGRAPH '80), Jul. 14-18, 1980, pp. 262-270, vol. 14, Issue 3, Association for Computing Machinery (ACM), Seattle, Washington.

Bragdon, et al., "Code Bubbles: A Working Set-based Interface for Code Understanding and Maintenance", Proceedings of the 28th international conference on Human factors in computing systems (CHI '10), Apr. 10-15, 2010, pp. 2503-2512, Association for Computing Machinery (ACM), Atlanta, Georgia.

Bragdon, et al., "GestureBar: Improving the Approachability of Gesture-based Interfaces", Proceedings of the 27th international conference on Human factors in computing systems (CHI '09), Apr. 4-9, 2009, pp. 2269-2278, Association for Computing Machinery (ACM), Boston, Massachusetts.

Bragdon, et al., "Gesture Select: Acquiring Remote Targets on Large Displays without Pointing", Proceedings of the 2011 annual conference on Human factors in computing systems (CHI '11), May 7-12, 2011, pp. 187-196, Association for Computing Machinery (ACM), Vancouver, British Columbia, Canada.

Brooks, et al., "The Intelligent Room Project", Proceedings of the 2nd International Conference on Cognitive Technology (CT '97), Aug. 25-28, 1997, pp. 271-278, Institute of Electrical and Electronics Engineers (IEEE), Aizu-Wakamatsu City, Japan.

Bump Technologies, Inc., "The Bump App for iPhone and Android", retrieved at <<http://bu.mp/>>, Jun. 20, 2011, pp. 1, Bump Technologies, Inc.

Fitzmaurice, et al., "Sentient Data Access via a Diverse Society of Devices", Queue—Instant Messaging magazine, Nov. 2003, pp. 52-63, vol. 1, Issue 8, Association for Computing Machinery (ACM), New York, New York.

Gellersen, et al., "Supporting device discovery and spontaneous interaction with spatial references", Journal of Personal and Ubiquitous Computing, May 2009, pp. 255-264, vol. 13, Issue 4, Springer-Verlag, London, United Kingdom.

Greenberg, et al., "PDAs and Shared Public Displays: Making Personal Information Public, and Public Information Personal", Personal Technologies, vol. 3, Issue 1, Mar. 1999, pp. 54-64, Springer-Verlag, London, United Kingdom.

Hassan, et al., "Chucking: A One-Handed Document Sharing Technique", Human-Computer Interaction—INTERACT 2009, Lecture Notes in Computer Science (LNCS), Aug. 2009, pp. 264-278, vol. 5727/2009, Springer-Verlag, Uppsala, Sweden.

Hinckley, et al., "A survey of design issues in spatial input", Proceedings of the 7th annual Association for Computing Machinery (ACM) symposium on User interface software and technology (UIST '94), Nov. 2-4, 1994, pp. 213-222, ACM, Marina del Rey, California.

Hinckley, et al., "Stitching: Pen Gestures that Span Multiple Displays", Proceedings of the working conference on Advanced visual interfaces (AVI '04), May 25-28, 2004, pp. 23-31, Association for Computing Machinery (ACM), Gallipoli (Lecce), Italy.

Hutama, et al., "Distinguishing Multiple Smart-Phone Interactions on a Multi-touch Wall Display using Tilt Correlation", Proceedings of the 2011 annual conference on Human factors in computing systems (CHI '11), May 7-12, 2011, pp. 3315-3318, Association for Computing Machinery (ACM), Vancouver, British Columbia, Canada.

Izadi, et al., "Dynamo: a public interactive surface supporting the cooperative sharing and exchange of media", Proceedings of the 16th annual Association for Computing Machinery (ACM) symposium on User interface software and technology (UIST '03), Nov. 2-5, 2003, pp. 159-168, ACM, Vancouver, Canada.

Jeon, et al., "Interaction Techniques in Large Display Environments using Hand-held Devices", Proceedings of the Association for Computing Machinery (ACM) symposium on Virtual reality software and technology (VRST '06), Nov. 1-3, 2006, pp. 100-103, ACM, Limassol, Cyprus.

Johanson, et al., "The Interactive Workspaces Project: Experiences with Ubiquitous Computing Rooms", Institute of Electrical and Electronics Engineers (IEEE) Pervasive Computing, Apr.-Jun. 2002, pp. 71-78, 1536-1268/02, IEEE Educational Activities Department, Piscataway, New Jersey.

Kurtenbach, et al., "The Limits Of Expert Performance Using Hierarchic Marking Menus", Proceedings of the INTERACT '93 and CHI '93 conference on Human factors in computing systems, Apr. 24-29, 1993, pp. 482-487, Association for Computing Machinery (ACM), Amsterdam, Netherlands.

Krumm, et al., "Multi-camera multi-person tracking for EasyLiving", Proceedings of the Third Institute of Electrical and Electronics EngineerS (IEEE) International Workshop on Visual Surveillance (VS'00), Jul. 1, 2000, pp. 1-8, IEEE, Dublin, Ireland.

Li, et al., "Virtual Shelves: Interactions with Orientation Aware Devices", Proceedings of the 22nd annual Association for Computing Machinery (ACM) symposium on User interface software and technology (UIST '09), Oct. 4-7, 2009, pp. 125-128, ACM, Victoria, British Columbia, Canada.

Mangano, et al., "Calico: A Prototype Sketching Tool for Modeling in Early Design", Proceedings of the 2008 international workshop on Models in software engineering (MiSE '08), May 10-18, 2008, pp. 63-68, Association for Computing Machinery (ACM), Leipzig, Germany.

Morris, et al., "Cooperative Gestures: Multi-User Gestural Interactions for Co-located Groupware", Proceedings of the Special Interest Group on Computer Human Interaction (SIGCHI) conference on Human Factors in computing systems (CHI '06), Apr. 22-28, 2006, pp. 1201-1210, Association for Computing Machinery (ACM), Montréal, Québec, Canada.

Myers, "Mobile Devices for Control", Proceedings of the 4th International Symposium on Mobile Human-Computer Interaction (Mobile HCI '02), Sep. 18-20, 2002, pp. 1-8, Springer-Verlag, Pisa, Italy.

Myers, "Using Multiple Devices Simultaneously for Display and Control", Institute of Electrical and Electronics Engineers (IEEE) Personal Communications, Oct. 2000, pp. 62-65, vol. 7, Issue 5, IEEE, New York, New York.

Olson, et al., "Small group design meetings: an analysis of collaboration", Human-Computer Interaction (HCI '92), Dec. 1992, pp. 347-374, vol. 7, Issue 4, L. Erlbaum Associates Inc., Hillsdale, New Jersey.

Oviatt, et al, "Integration and synchronization of input modes during multimodal human-computer interaction", Proceedings of

(56) References Cited

OTHER PUBLICATIONS the Special Interest Group on Computer Human Interaction (SIGCHI) conference on Human factors in computing systems (CHI '97), Mar. 22-27, 1997, pp. 415-422, ACM, Atlanta, Georgia.

Paek, et al., "Toward Universal Mobile Interaction for Shared Displays", Proceedings of the 2004 Association for Computing Machinery (ACM) conference on Computer supported cooperative work (CSCW'04), Nov. 6-10, 2004, pp. 266-269, ACM, Chicago, Illinois.

Parnin, et al., "CodePad: Interactive Spaces for Maintaining Concentration in Programming Environments", Proceedings of the 5th international symposium on Software visualization (SOFTVIS '10), Oct. 25-26, 2010, pp. 15-24, Association for Computing Machinery (ACM), Salt Lake City, Utah.

Rekimoto, "A multiple device approach for supporting whiteboard-based interactions", Proceedings of the Special Interest Group on Computer Human Interaction (SIGCHI) conference on Human factors in computing systems (CHI '98), Apr. 18-23, 1998, pp. 344-351, Association for Computing Machinery (ACM) Press/ Addison-Wesley Publishing Co., Los Angeles, California.

Rekimoto, et al., "Augmented Surfaces: A Spatially Continuous Work Space for Hybrid Computing Environments", Proceedings of the Association for Computing Machinery (ACM) Conference on Human Factors in Computing Systems (CHI '99), May 15-20, 1999, pp. 378-385, ACM, Pittsburgh, Pennsylvania.

Rekimoto, "Multiple-computer user interfaces: "beyond the desktop" direct manipulation environments", Extended abstracts from Conference on Human Factors in Computing Systems (CHI '00), Apr. 1-6, 2000, pp. 6-7, Association for Computing Machinery (ACM), The Hague, Netherlands.

Rekimoto, et al., "Pick-and-drop: a direct manipulation technique for multiple computer environments", Proceedings of the 10th annual Association for Computing Machinery (ACM) symposium on User interface software and technology (UIST '97), Oct. 14-17, 1997, pp. 31-39, ACM, Banff, Alberta, Canada.

Rico, et al., "Usable Gestures for Mobile Interfaces: Evaluating Social Acceptability", Proceedings of the 28th international conference on Human factors in computing systems (CHI '10), Apr. 10-15, 2010, pp. 887-896, Association for Computing Machinery (ACM), Atlanta, Georgia.

Schöning, et al., "Using Mobile Phones to Spontaneously Authenticate and Interact with Multi-Touch Surfaces", Workshop on designing multi-touch interaction techniques for coupled public and private displays (PPD '08), May 31, 2008, pp. 41-45, retrieved at <<http://www.mendeley.com/research/using-mobile-phones-spontaneously-authenticate-interact-multitouch-surfaces-1/#page-1>>, Napoli, Italy.

Streitz, et al., "i-LAND: An interactive Landscape for Creativity and Innovation", Proceedings of the Association for Computing Machinery (ACM) Conference on Human Factors in Computing Systems (CHI '99), May 15-20, 1999, pp. 120-127, ACM, Pittsburgh, Pennsylvania.

Vogel, et al., "Interactive Public Ambient Displays: Transitioning from Implicit to Explicit, Public to Personal, Interaction with Multiple Users", Proceedings of the 17th annual Association for Computing Machinery (ACM) symposium on User interface software and technology (UIST '04), Oct. 24-27, 2004, pp. 137-146, ACM, Santa Fe, New Mexico.

Wigdor, et al., "WeSpace: the design development and deployment of a walk-up and share multi-surface visual collaboration system", Proceedings of the 27th international conference on Human factors in computing systems (CHI '09), Apr. 4-9, 2009, pp. 1237-1246, Association for Computing Machinery (ACM), Boston, Massachusetts.

Wilson, et al., "BlueTable: Connecting Wireless Mobile Devices on Interactive Surfaces Using Vision-Based Handshaking", Proceedings of the Graphics Interface 2007 (GI '07), May 28-30, 2007, pp. 119-125, Association for Computing Machinery (ACM), Montreal, Canada.

Wilson, et al., "Combining Multiple Depth Cameras and Projectors for Interactions On, Above, and Between Surfaces", Proceedings of the 23nd annual Association for Computing Machinery (ACM) symposium on User interface software and technology (UIST '10), Oct. 3-6, 2010, pp. 273-282, ACM, New York, New York.

Zeleznik, et al., "Hands-on math: a page-based multi-touch and pen desktop for technical work and problem solving", Proceedings of the 23nd annual Association for Computing Machinery (ACM) symposium on User interface software and technology (UIST '10), Oct. 3-6, 2010, pp. 17-26, ACM, New York, New York.

\* cited by examiner

INFORMATION SHARING DEMOCRATIZATION FOR CO-LOCATED GROUP MEETINGS

CROSS REFERENCE TO RELATED APPLICATION

This application is a divisional of a prior application entitled "INFORMATION SHARING DEMOCRATIZATION FOR CO-LOCATED GROUP MEETINGS", which was assigned Ser. No. 13/278,065 and filed Oct. 20, 2011. This application claims the benefit of and priority to the aforementioned prior application.

BACKGROUND

Project teams routinely hold group meetings to discuss the projects they are working on. During these group meetings the meeting attendees may discuss the status of tasks associated with a given project, they may assign and prioritize the tasks, and they may make decisions on the project, among other things. These group meetings are often very collaborative and interactive. Additionally, these group meetings can involve frequent information sharing between two or more of the meeting attendees. These group meetings can also involve "on-the-fly" information manipulation and/or annotation by a given meeting attendee, where the manipulation/annotation is intended to be publically viewable by the other meeting attendees. Due to ongoing technology advances in areas such as portable personal computing devices, mobile computing applications, data communication, and computer networking, the meeting attendees will often each bring one or more portable personal computing devices to these group meetings.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Information sharing democratization technique embodiments described herein generally involve democratizing information sharing during a co-located group meeting in a meeting space. In one exemplary embodiment, whenever a condition occurs which includes a meeting attendee who is not within a prescribed distance of a public display device in the meeting space forming a remote location indicator posture and remotely pointing this posture at the public display device, a computer will operate cooperatively with an audience-oriented object sensing device in the meeting space to identify this condition. The computer will also enable a remote location indicator mode for as long as this condition continues, and will display a location indicator on the public display device in a position thereon corresponding to where the remote location indicator posture is currently being pointed.

In another exemplary embodiment, whenever another condition occurs which includes a first meeting attendee who is within a prescribed distance of a public display device having a touch-enabled display screen in the meeting space forming the remote location indicator posture and remotely pointing this posture at a second meeting attendee who is not within the prescribed distance of the public display device, a computer will operate cooperatively with both an audience-oriented object sensing device in the meeting space, and a presenter-oriented object sensing device in the meeting space, to identify this condition, identify the second meeting attendee, and identify a personal computing device that is associated with the second meeting attendee. The computer will also enable a presenter-to-audience-member transfer mode for as long as this condition continues. Whenever the presenter-to-audience-member transfer mode is enabled and the first meeting attendee performs an information-push touch gesture on an information object that is displayed on the display screen, the computer will transmit a copy of the information object to the personal computing device.

In yet another exemplary embodiment, whenever a first condition occurs which includes a first meeting attendee who is using a touch-enabled non-handheld computing device forming the remote location indicator posture and remotely pointing this posture at a second meeting attendee, a computer will operate cooperatively with an object sensing device in the meeting space to identify the first condition, identify the second meeting attendee, and identify a personal computing device that is associated with the second meeting attendee. The computer will also enable a peer-to-peer transfer mode for as long as the first condition continues. Whenever the peer-to-peer transfer mode is enabled and the first meeting attendee performs the information-push touch gesture on a first information object that is displayed on a display screen of the non-handheld computing device, the computer will receive a copy of the first information object from the non-handheld computing device, and will forward the copy of the first information object to the personal computing device. Whenever a second condition occurs which includes the peer-to-peer transfer mode being disabled and a third meeting attendee who is using a touch-enabled handheld computing device forming a device pointing posture and remotely pointing this posture at the second meeting attendee, the computer will operate cooperatively with the object sensing device to identify the second condition, identify the second meeting attendee, and identify a personal computing device that is associated with the second meeting attendee. The computer will also enable the peer-to-peer transfer mode for as long as the second condition continues. Whenever the peer-to-peer transfer mode is enabled and the third meeting attendee performs the information-push touch gesture on a second information object that is displayed on a display screen of the handheld computing device, the computer will receive a copy of the second information object from the handheld computing device, and will forward the copy of the second information object to the personal computing device.

DESCRIPTION OF THE DRAWINGS

The specific features, aspects, and advantages of the information sharing democratization technique embodiments described herein will become better understood with regard to the following description, appended claims, and accompanying drawings where:

DETAILED DESCRIPTION

Figure 1:
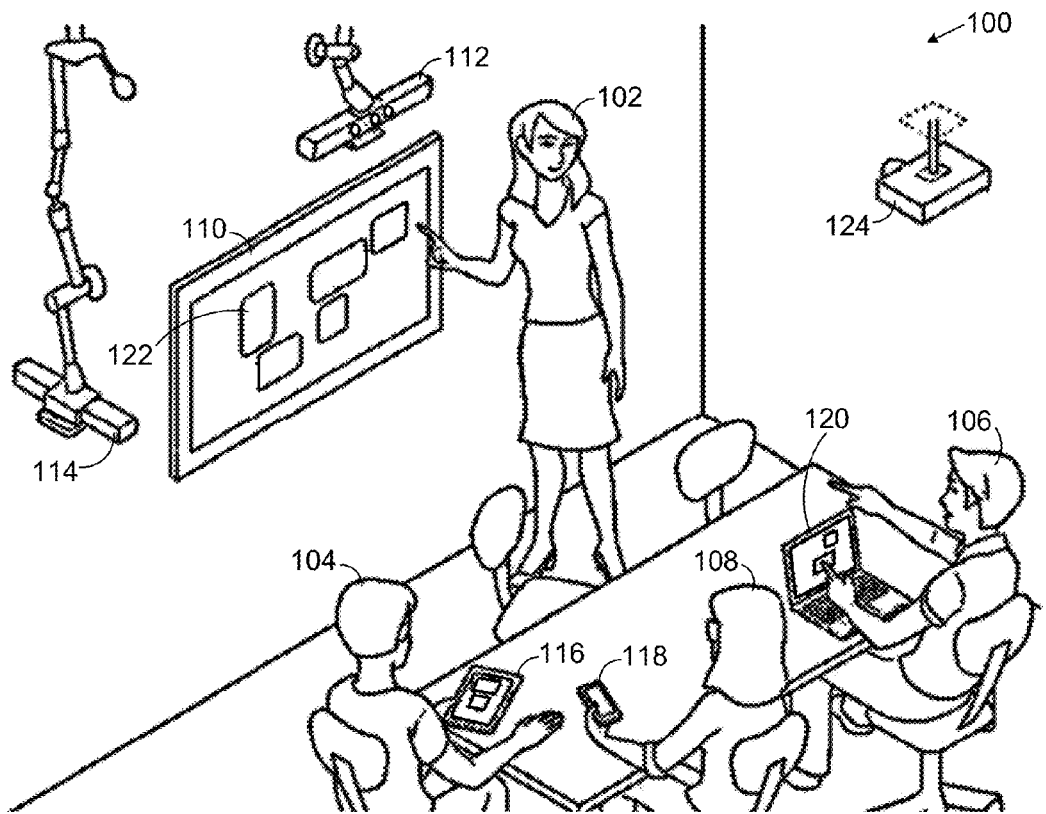
FIG. 1 is a diagram illustrating an exemplary embodiment, in simplified form, of a meeting space framework for implementing the information sharing democratization technique embodiments described herein.

In the following description of information sharing democratization technique embodiments reference is made to the accompanying drawings which form a part hereof, and in which are shown, by way of illustration, specific embodiments in which the information sharing democratization technique can be practiced. It is understood that other embodiments can be utilized and structural changes can be made without departing from the scope of the information sharing democratization technique embodiments.

The term "portable personal computing device" is used herein to refer to a networking-enabled computing device that is carried by a meeting attendee and can be utilized by the meeting attendee during a group meeting that is being held with other meeting attendees. The term "touch-enabled" when applied to a device is used herein to indicate that the device includes a touch-sensitive display screen which can detect the presence and location of one or more touches or touch-based movements thereon, where these touches/movements can be made with hands, passive objects (such as a stylus or the like), and the like. The information sharing democratization technique embodiments described herein are operational with any type of touch-enabled portable personal computing device examples of which include, but are not limited to, touch-enabled handheld computing devices (such as smartphones, personal digital assistants, and the like), tablet computers (which by definition are touch-enabled), and touch-enabled laptop computers (also known at notebook computers). The term "information object" is used herein to refer to a particular item of online (e.g., digital) information content, or various types of iconic representations thereof, which can include one or more different types of digital information such as text, images, animations, audio, video, web hyperlinks, and the like. The term "copy" when applied to an information object (e.g., a copy of an information object) is used herein to refer to either a bit for bit replication of the information object (e.g., a file copy), or a user-selectable link to the information object (e.g., a Uniform Resource Locator (URL)).

1.0 Information Sharing Democratization for Co-Located Group Meetings

Generally speaking, the information sharing democratization technique embodiments described herein involve supporting co-located, collaborative group meetings in a meeting space by democratizing access to, control of, manipulation of, and sharing of information objects across one or more touch-enabled portable personal computing devices and a public display device. Such meetings can be attended by any group of two or more meeting attendees who are physically co-located together in the meeting space and wish to discuss and share information in a collaborative and interactive manner. One example of such a group of meeting attendees is the aforementioned project team that routinely holds a group meeting to discuss a project they are working on. Exemplary types of project teams include a software development team and a marketing program development team, among others.

During project team group meetings the meeting attendees generally work together to sort, filter, edit and categorize collections of information objects. The formal structure of these meetings is often punctuated by moments of open-ended discussion and white-boarding (sometimes collectively referred to as "brainstorming"). These meetings are commonly held in a meeting space (such as a conference room or the like) having a public display device which is viewable by all the meeting attendees. The information objects are commonly stored on a central computing device which is connected to and operates cooperatively with the public display device, where the central computing device renders the objects and displays them on the public display device.

Generally speaking and as will be appreciated from the more detailed description that follows, the information sharing democratization technique embodiments described herein are based on a skeletal tracking user interface which allows the meeting attendees to employ various multi-modal user interaction methods which seamlessly span different modalities and devices, and which accomplish the aforementioned sharing of information objects. These multi-modal user interaction methods thus create cross-device interactions. The information sharing democratization technique embodiments employ various types of in-air gestures performed by the meeting attendees, along with various types of postures formed by the meeting attendees, for social disclosure of commands, targeting and mode setting. The information sharing democratization technique embodiments also employ various types of direct-touch input (herein also referred to as "touch gestures") performed by the meeting attendees for command selection/execution and precise gestures.

The information sharing democratization technique embodiments described herein are advantageous for various reasons including, but not limited to, the following. The information sharing democratization technique embodiments provide for a collaborative, three-dimensional design space which supports proxemic interactions (i.e., proximity-aware, physically situated experiences) amongst a plurality of meeting attendees in a meeting space framework that includes the public display device and a plurality of heterogeneous, touch-enabled portable personal computing devices. The information sharing democratization technique embodiments are simple, fluid, intuitive, robust, and make common information sharing tasks more democratically accessible. The information sharing democratization technique embodiments allow each meeting attendee to interact with the public display device from anywhere in the meeting space and with any touch-enabled portable personal computing device they bring to the meeting. The information sharing democratization technique embodiments are socially acceptable in a group meeting context and do not cause embarrassment of or distraction to the meeting attendees. More particularly and by way of example but not limitation, the information sharing democratization technique embodiments do not employ gestures based on large hand/arm/body motions (such as arm/hand waving, among others), or unusual gestures, or uncomfortable gestures, or gestures that could interfere with communication between the meeting attendees.

The information sharing democratization technique embodiments described herein manifest to the meeting attendees which particular attendee is interacting with the public display device at any given point in time, and which particular attendees are interacting with each other at any given point in time, thus creating a group awareness of such interactions. It will be appreciated that without such manifestations, it could be unsettling to the meeting attendees (and thus disruptive to the meeting) to see information objects being remotely manipulated on the public display device without knowing which meeting attendee is doing the manipulation. The information sharing democratization technique embodiments do not rely upon the use of speech which can be ambiguous and can disrupt the natural conversations which take place between the meeting attendees. It is noted however that alternate embodiments of the information sharing democratization technique are possible which can selectively incorporate the use of speech. The information sharing democratization technique embodiments utilize simple grammars and each modality that is employed in these embodiments has a separate use, thus making these embodiments easy to learn and reducing the potential for errors.

In contrast to the conventional group meeting paradigm in which one of the meeting attendees serves as a presenter who centrally controls the dissemination of the information objects during a group meeting that is being held in a meeting space (i.e., the presenter controls which information objects are displayed on the public display device at each point in time), the information sharing democratization technique embodiments described herein provide democratic access to the information objects. In other words, the information sharing democratization technique embodiments generally allow the meeting attendees to remotely share relevant information objects with each other, and also remotely interact with and share relevant information objects with the public display device, all in a very low-overhead manner which does not interrupt the meeting's flow or distract from the meeting's subject matter. The information sharing democratization technique embodiments also effectively manage contention for the public display device by using touch gestures, in-air gestures and postures together in hybrid interactions. More particularly, the information sharing technique embodiments use skeletal tracking of simple and familiar motions to specify modes and operands, and use touch input to confirm and complete actions and commands.

More particularly and by way of example but not limitation, during a group meeting the information sharing democratization technique embodiments allow any meeting attendee to freely disseminate one or more relevant information objects, which are stored on a touch-enabled portable personal computing device they bring to the meeting, either by transmitting the information objects to the public display device so they can be publically viewed by all of the other meeting attendees, or by transmitting the information objects to the personal computing device of another meeting attendee so they can be privately viewed by such attendee. The information sharing democratization technique embodiments also allow any meeting attendee to freely download desired information objects from the public display device in the meeting space to a touch-enabled portable personal computing device they bring to the meeting. Such transmissions of information objects to, and downloads of information objects from, the public display device can be accomplished without the meeting attendees having to switch which computing device is connected to the public display device.

As will also be appreciated from the more detailed description that follows, rather than employing specialized remote controllers which can be expensive and can get lost, the information sharing democratization technique embodiments described herein employ controller-less in-air gestures and postures which are performed by the meeting attendees. The information sharing democratization technique embodiments also allow the meeting attendees to optionally use any touch-enabled portable personal computing device they bring to the meeting as a remote controller.

1.1 Meeting Space Framework

FIG. 1 illustrates an exemplary embodiment, in simplified form, of a meeting space framework for implementing the information sharing democratization technique embodiments described herein. As exemplified in FIG. 1, a plurality of meeting attendees 102/104/106/108 are physically co-located together in a meeting space 100 for the purpose of holding a group meeting. One or more of the meeting attendees 102 may act as a presenter during the meeting, and this role of presenter may be assumed by different meeting attendees during the course of the meeting. Generally speaking and as described heretofore, the meeting attendees may bring various types of touch-enabled portable personal computing devices to the meeting. More particularly and as exemplified in FIG. 1, one meeting attendee 104 may bring a tablet computer 116 to the meeting. Another meeting attendee 108 may bring a touch-enabled handheld computing device 118 to the meeting. Yet another meeting attendee 106 may bring a touch-enabled laptop computer 120 to the meeting. A gesture identification application runs on each touch-enabled portable personal computing device that is brought to the meeting, where this application serves to identify any touch gestures that are performed on the display screen of the device.

Referring again to FIG. 1, the meeting space 100 includes a public display device 110 which is connected to and operates cooperatively with a central computing device (not shown). A collection of information objects being discussed during the meeting are stored on the central computing device. A selected one or ones of these stored information objects 122 are rendered by the central computing device and displayed on the public display device 110 for public viewing by all of the meeting attendees 102/104/106/108. In the meeting space framework embodiment exemplified in FIG. 1 the public display device 110 is mounted on a wall of the meeting space 100. It is noted that alternate embodiments of the meeting space framework (not shown) are possible where the public display device can be mounted and positioned in the meeting space in any other manner which makes it publically viewable by all of the meeting attendees.

The public display device can optionally be touch-enabled. In other words, the public display device can optionally include a touch-sensitive display screen which can detect the presence and location of one or more touches or touch gestures thereon, where these touch gestures can be made with either hands or passive objects (such as a stylus or the like), among other things. Whenever the central computing device is connected to a touch-enabled public display device, a gesture identification application running on the central computing device will operate cooperatively with the public display device to identify any touch gestures that are performed on its display screen.

Generally speaking, the meeting space also includes a plurality of object sensing devices each of which also is connected to and operates cooperatively with the central computing device. More particularly, in the meeting space framework embodiment exemplified in FIG. 1 the meeting space 100 also includes a presenter-oriented object sensing device 114 which is physically located in the meeting space such that this sensing device 114 operates cooperatively with a skeletal tracking application running on the central computing device to identify the current physical location of any meeting attendees who are within a prescribed distance (e.g., ten feet) of the public display device 110 (e.g., attendee 102, hereafter simply referred to as "presenters"), and also identify the in-air gestures and postures performed by such attendees, among other things. The meeting space 100 also includes an audience-oriented object sensing device 112 which is physically located in the meeting space 100 such that this sensing device 112 operates cooperatively with the skeletal tracking application running on the central computing device to identify the current physical location of any other meeting attendees who are not within the prescribed distance of the public display device 110 (e.g., attendees 104/106/108, hereafter simply referred to as "audience members"), and also identify the in-air gestures and postures performed by such attendees, among other things. In the case where a given gesture or posture performed by a given meeting attendee involves a portable personal computing device (various examples of which are provided hereafter), the audience-oriented object sensing device 112 also operates cooperatively with the skeletal tracking application to identify the device and associate it with the gesture/posture. It will be appreciated that the portable personal computing device can be indentified using various methods such as either visual tagging, or infrared beacons which are transmitted from the device, or low-power radio signaling (e.g., Bluetooth) which emanates from the device, among others.

In an exemplary embodiment of the information sharing democratization technique described herein, the skeletal tracking application performs hand posture recognition using a conventional heuristic method that computes the average number of radial gaps between fingers on a hand. Alternate embodiments of the information sharing democratization technique are also possible which use other methods such as optical flow and statistical interference, among others. Alternate embodiments of the information sharing democratization technique are also possible which recognize other types of postures.

Referring again to FIG. 1, the object sensing devices 112 and 114 can be implemented in various ways including, but not limited to, the following. In one embodiment of the information sharing democratization technique described herein each object sensing device is an infrared projector combined with an infrared camera that is matched to the infrared projector in order to produce an ongoing series of depth maps of the meeting space 100. In another embodiment of the information sharing democratization technique each object sensing device is an ultrasound transmitter combined with an ultrasound receiver that is matched to the ultrasound transmitter. In yet another embodiment of the information sharing democratization technique each object sensing device is a pair of visible light video cameras (also known as RGB (red/green/blue) video cameras) which operate together as a stereo video camera. In yet another embodiment of the information sharing democratization technique each object sensing device is just a single visible light video camera. Additional embodiments of the information sharing democratization technique are also possible where each object sensing device can include various combinations of the infrared projector and matching infrared camera, the ultrasound transmitter and matching ultrasound receiver, the pair of visible light video cameras, and the single visible light video camera. Additional embodiments of the information sharing democratization technique are also possible where the different object sensing devices are implemented in different ways.

Referring again to FIG. 1, the meeting space 100 can optionally also include an optical projection device 124 which also is connected to and operates cooperatively with the central computing device. The optical projection device 124 is physically located in the meeting space such that this projection device operates cooperatively with a tertiary display application running on the central computing device to optically project a tertiary display region (not shown) onto a prescribed location on an optically-reflective, surface in the meeting space that is near the public display device (hereafter simply referred to as a "tertiary surface"). The tertiary display region can thus be viewed by all of the meeting attendees. In the meeting space framework embodiment exemplified in FIG. 1 the optical projection device 124 is mounted on the ceiling of the meeting space 100, the tertiary surface is a wall in the meeting space upon which the public display device is mounted, and the prescribed location is immediately above the public display device. In an alternate embodiment of the information sharing democratization technique the tertiary surface can be a portable projector screen (or the like) and the prescribed location can be either immediately to the right or to the left of the public display device, among other places.

1.2 System Framework

Figure 2:
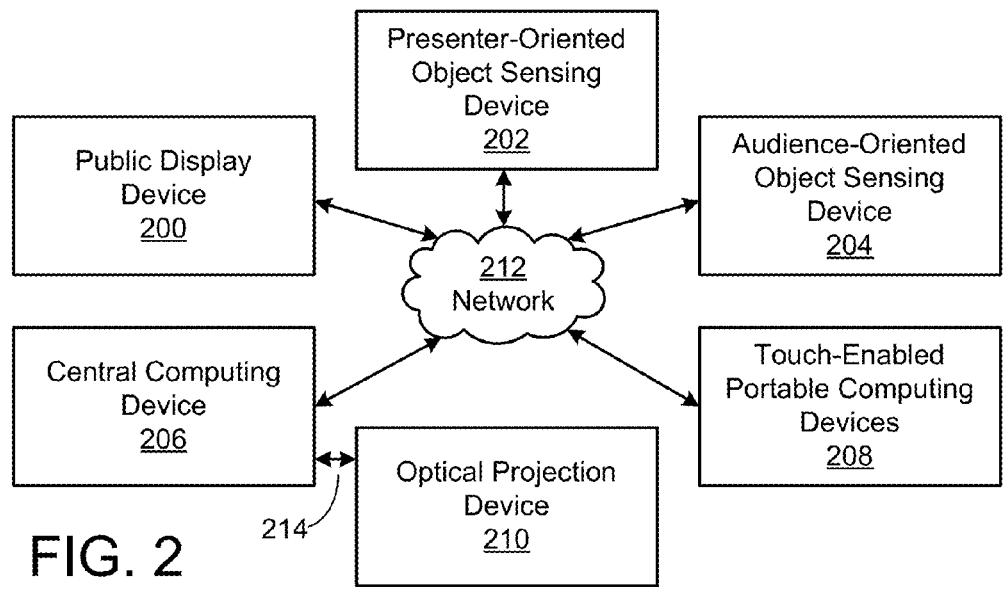
FIG. 2 is a diagram illustrating an exemplary embodiment, in simplified form, of a system framework for implementing the information sharing democratization technique embodiments described herein.

FIG. 2 illustrates an exemplary embodiment, in simplified form, of a system framework for implementing the information sharing democratization technique embodiments described herein. As exemplified in FIG. 2, the public display device 200, the presenter-oriented object sensing device 202, the audience-oriented object sensing device 204, the central computing device 206, and the touch-enabled portable personal computing devices 208 are interconnected via a data communications network 212. This network can be implemented as either a conventional wired local area network (such as Ethernet, or the like), or a conventional wireless local area network (such as Wi-Fi, or the like), or a combination thereof. The optical projection device 210 is connected directly to the central computing device 206 via a video connection 214 such as either a composite video connection, or an S-video connection, or an RGB video connection, or the like.

1.3 Remotely Interacting With Public Display Device

This section describes exemplary embodiments of information sharing democratization techniques for allowing the audience members to remotely interact with this the public display device.

1.3.1 Pointing and Dragging With Arm

Figures 3A, 3B, 3C:
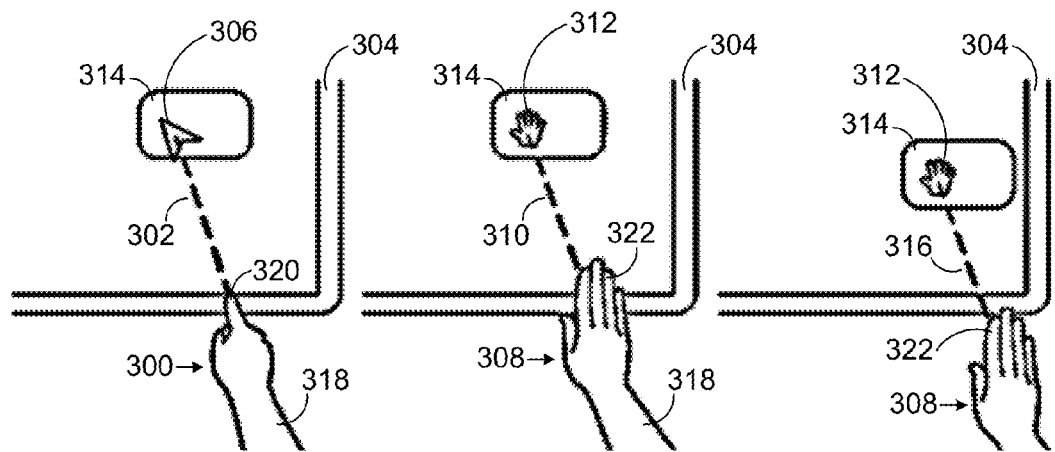
FIGS. 3A-3C are diagrams illustrating one embodiment, in simplified form, of information sharing democratization techniques for allowing a meeting audience member to remotely point at a public display device and remotely manipulate an information object that is displayed on this device.

FIGS. 3A-3C illustrate one embodiment, in simplified form, of information sharing democratization techniques for allowing an audience member to remotely point at the public display device and remotely manipulate an information object that is displayed on this device. As exemplified in FIG. 3A, whenever a condition occurs where an audience member forms a remote location indicator posture 300 and remotely points 302 this posture at the public display device 304, the skeletal tracking application running on the central computing device will operate cooperatively with the audience-oriented object sensing device to identify this condition, and the central computing device will enable a remote location indicator mode and display a location indicator 306 on the public display device, where the position of the location indicator on the public display device corresponds to where the remote location indicator posture is currently being pointed. Generally speaking, the remote location indicator posture 300 can be implemented using any type of posture that is recognizable by the combination of the audience-oriented object sensing device and skeletal tracking application, and can be differentiated from the other postures described herein. By way of example but not limitation, in the particular technique embodiment exemplified in FIG. 3A the remote location indicator posture 300 is implemented as an arm 318 of the audience member being extended away from their body and one or more fingers 320 of the arm being pointed away from their body in the same general direction as the arm.

In the particular information sharing democratization technique embodiment exemplified in FIG. 3A the location indicator 306 is implemented as a cursor. Alternate information sharing democratization technique embodiments (not shown) are also possible where the location indicator is implemented in other ways. By way of example but not limitation, the location indicator can be implemented as a static spotlight that indicates a general area of the public display device's screen. The location indicator can also be implemented as an overlay that indicates a prescribed portion (e.g., a quadrant) of the public display device's screen. The location indicator can also be implemented as a colored border around such a prescribed portion of the public display device's screen.

Referring again to FIG. 3A, the central computing device will remain in the remote location indicator mode and continue to display the location indicator 306 on the public display device 304 for as long as the audience member maintains the remote location indicator posture 300 and points 302 it at the public display device. The audience member can thus use the remote location indicator posture 300 to remotely and precisely point at either a desired location on the public display device 304 or a particular information object 314 that is displayed on the public display device.

Referring again to FIG. 3A, whenever the remote location indicator mode is enabled and the audience member changes where on the public display device 304 their remote location indicator posture 300 is currently being pointed 302, the skeletal tracking application will operate cooperatively with the audience-oriented object sensing device to track these changes, and the central computing device will move the location indicator 306 on the public display device accordingly (thus allowing the audience member to remotely move the location indicator on the public display device). Whenever the remote location indicator mode is enabled and another condition occurs where the audience member either stops forming the remote location indicator posture 300 or points it away from the public display device 304, the skeletal tracking application will operate cooperatively with the audience-oriented object sensing device to identify this condition, and the central computing device will disable the remote location indicator mode and remove the location indicator 306 from the public display device.

As exemplified in FIGS. 3B and 3C, whenever another condition occurs where an audience member forms remote dragging posture 308 and remotely points 310 this posture at the public display device 304, the skeletal tracking application will operate cooperatively with the audience-oriented object sensing device to identify this condition, and the central computing device will enable a remote dragging mode and display a dragging cursor 312 on the public display device, where the position of the dragging cursor on the public display device corresponds to where this posture is currently being pointed. Generally speaking, the remote dragging posture 308 can be implemented using any type of posture that is recognizable by the combination of the audience-oriented object sensing device and skeletal tracking application, and can be differentiated from the other postures described herein. By way of example but not limitation, in the particular technique embodiment exemplified in FIGS. 3B and 3C the remote dragging posture 308 is implemented as an arm 318 of the audience member being extended away from their body with all of the fingers 322 of the arm being bunched together and the palm of the arm being approximately perpendicular to the floor of the meeting space. The central computing device will remain in the remote dragging mode and continue to display the dragging cursor 312 on the public display device 304 for as long as the audience member maintains the remote dragging posture 308 and points 310/316 it at the public display device.

Referring again to FIGS. 3B and 3C, whenever the remote dragging mode is enabled, and the audience member points 310 their remote dragging posture 308 at a particular information object 314 that is displayed on the public display device 304 and then changes where on the public display device this posture is being pointed 316, the skeletal tracking application will operate cooperatively with the audience-oriented object sensing device to track these changes, and the central computing device will move the information object on the public display device accordingly (thus allowing the audience member to remotely move the information object on the public display device). Whenever the remote dragging mode is enabled and another condition occurs where the audience member either stops forming the remote dragging posture 308 or points it away from the public display device 304, the skeletal tracking application will operate cooperatively with the audience-oriented object sensing device to identify this condition, and the central computing device will disable the remote dragging mode and remove the dragging cursor 312 from the public display device.

In the case where the audience-oriented and presenter-oriented object sensing devices have a low sensing resolution, the center point of the public display device can be calibrated to be aligned in absolute coordinates using conventional methods. Outward from this center point a gain factor having a value of less than one can be applied by the central computing device to create greater pointing precision. In the context of the information sharing democratization technique embodiments described herein the term "gain factor" refers to a ratio of physical movement in real space to how far an object being displayed on a display device (such as a location indicator or the like) will move in relation to the physical movement. In the case where the audience-oriented and presenter-oriented object sensing devices have a greater sensing resolution, absolute pointing (e.g., a gain factor of one) can be employed by the central computing device. In the case where the audience-oriented and presenter-oriented object sensing devices are implemented as an infrared projector combined with an infrared camera that is matched to the infrared projector in order to produce an ongoing series of depth maps as described heretofore, and these sensing devices are intended to recognize hand postures, the skeletal tracking application running on the central computing device can segment the hand, and then track any movement of the hand by averaging the depth maps in a prescribed radius surrounding the segmented hand.

1.3.2 Pointing and Dragging with Arm and Hand-Held Computing Device

Figures 4A, 4B, 4C:
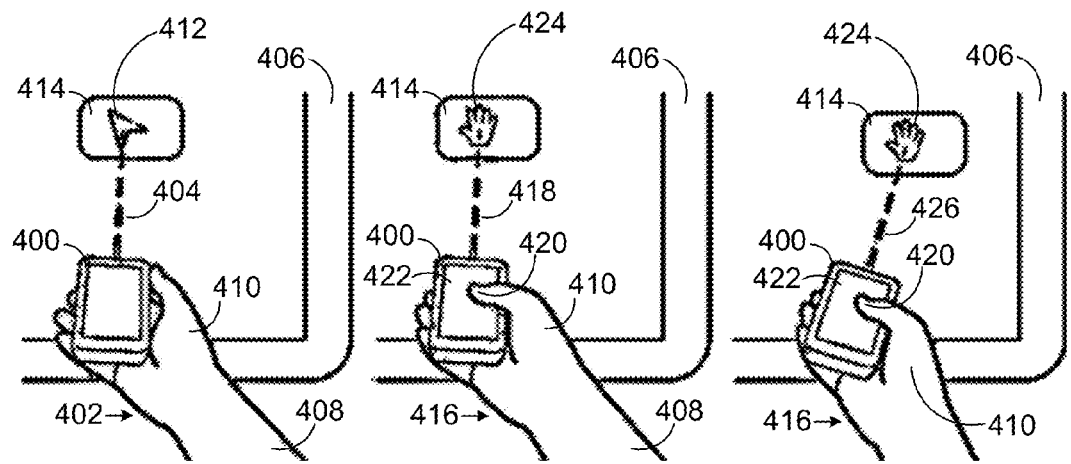
FIGS. 4A-4C are diagrams illustrating another embodiment, in simplified form, of information sharing democratization techniques for allowing a meeting audience member to remotely point at the public display device and remotely manipulate an information object that is displayed on this device.

FIGS. 4A-4C illustrate another embodiment, in simplified form, of information sharing democratization techniques for allowing an audience member to remotely point at the public display device and remotely manipulate an information object that is displayed on this device. As exemplified in FIG. 4A, whenever a condition occurs where an audience member who is using a touch-enabled handheld computing device 400 forms a device pointing posture 402 with this device and remotely points 404 this posture at the public display device 406, the skeletal tracking application running on the central computing device will operate cooperatively with the audience-oriented object sensing device to identify this condition, and the central computing device will enable a device pointing mode and display the location indicator 412 on the public display device, where the position of the location indicator on the public display device corresponds to where this posture is currently being pointed. Generally speaking, the device pointing posture 402 can be implemented using any type of posture that is recognizable by the combination of the audience-oriented object sensing device and skeletal tracking application, and can be differentiated from the other postures describe herein. By way of example but not limitation, in the particular technique embodiment exemplified in FIG. 4A the device pointing posture 402 is implemented as an arm 408 of the audience member being extended away from their body with the handheld computing device 400 being held in the hand 410 of the arm and being pointed away from their body in the same general direction as the arm.

Referring again to FIG. 4A, the central computing device will remain in the device pointing mode and continue to display the location indicator 412 on the public display device 406 for as long as the audience member maintains the device pointing posture 402 and points 404 it at the public display device. The audience member can thus use the device pointing posture 402 to remotely and precisely point at either a particular location on the public display device 406 or a particular information object 414 that is displayed on the public display device.

Referring again to FIG. 4A, whenever the device pointing mode is enabled and the audience member changes where on the public display device 406 their device pointing posture 402 is being pointed 404, the skeletal tracking application will operate cooperatively with the audience-oriented object sensing device to track these changes and the central computing device will move the location indicator 412 on the public display device accordingly (thus allowing the audience member to remotely move the location indicator on the public display device). Whenever the device pointing mode is enabled and another condition occurs where the audience member either stops forming the device pointing posture 402 or points it away from the public display device 406 (e.g., whenever the audience member puts the handheld computing device 400 down, among other things), the skeletal tracking application will operate cooperatively with the audience-oriented object sensing device to identify this condition, and the central computing device will disable the device pointing mode and remove the location indicator 412 from the public display device.

As exemplified in FIGS. 4B and 4C, whenever another condition occurs where an audience member who is using a touch-enabled handheld computing device 400 forms a device dragging posture 416 with this device and remotely points 418 this posture at the public display device 406, the skeletal tracking application will operate cooperatively with the audience-oriented object sensing device to identify this condition, and the central computing device will enable a device dragging mode and display the dragging cursor 424 on the public display device, where the position of the dragging cursor on the public display device corresponds to where this posture is being pointed. Generally speaking, the device dragging posture 416 can be implemented using any type of posture that is recognizable by the combination of the audience-oriented object sensing device and skeletal tracking application, and can be differentiated from the other postures describe herein. By way of example but not limitation, in the particular technique embodiment exemplified in FIGS. 4B and 4C the device dragging posture 416 is implemented as an arm 408 of the audience member being extended away from their body with the handheld computing device 400 being held in the hand of the arm and being pointed away from their body in the same general direction as the arm, and a finger 420 of the arm/hand pressing a dragging icon (not shown) that is being displayed on the display screen 422 of the handheld computing device. The central computing device will remain in the device dragging mode and continue to display the dragging cursor 424 on the public display device 406 for as long as the audience member maintains the device dragging posture 416 and points 418/426 it at the public display device 406.

Referring again to FIGS. 4B and 4C, whenever the device dragging mode is enabled, and the audience member points 418 their device dragging posture 416 at a particular information object 414 that is displayed on the public display device 406 and then changes where on the public display device this posture is being pointed 426, the skeletal tracking application will operate cooperatively with the audience-oriented object sensing device to track these changes and the central computing device will move the information object on the public display device accordingly (thus allowing the audience member to remotely move the information object on the public display device). Whenever the device dragging mode is enabled and another condition occurs where the audience member either stops forming the device dragging posture 416 or points it away from the public display device 406 (e.g., whenever the audience member puts the handheld computing device 400 down, or stops pressing their finger 420 on the dragging icon, among other things), the skeletal tracking application will operate cooperatively with the audience-oriented object sensing device to identify this condition, and the central computing device will disable the device dragging mode and remove the dragging cursor 424 from the public display device.

It is noted that rather than the device dragging posture being formed uni-manually (i.e., with the same hand that is holding the touch-enabled handheld computing device being used to press the dragging icon) as just described, an alternate embodiment of the information sharing democratization technique described herein is also possible where the device dragging posture is formed bi-manually (i.e., with a different hand than the one that is holding the handheld computing device being used to press the dragging icon). Additionally, it will be appreciated that the use of the touch-enabled handheld computing device to remotely manipulate information on the public display device is advantageous since it is both direct and precise.

1.3.3 Annotating Temporarily With Arm and Hand-Held Computing Device

This section describes an exemplary embodiment of an information sharing democratization technique for allowing an audience member to remotely draw one or more temporary annotation marks on the public display device. As will be appreciated from the more detailed description that follows, this technique embodiment is advantageous since it allows any audience member to visually accentuate features remotely on the public display device.

Whenever a condition occurs where an audience member who is using a touch-enabled handheld computing device forms a device annotating posture with this device and remotely points this posture at the public display device, the skeletal tracking application running on the central computing device will operate cooperatively with the audience-oriented object sensing device to identify this condition, and the central computing device will enable a remote annotation mode. Generally speaking, the device annotating posture can be implemented using any type of posture that is recognizable by the combination of the audience-oriented object sensing device and skeletal tracking application, and can be differentiated from the other postures describe herein. By way of example but not limitation, in an exemplary embodiment of the information sharing democratization technique described herein the device annotating posture is implemented as an arm of the audience member being extended away from their body with the handheld computing device being held in the hand of the arm and being pointed away from their body in the same general direction as the arm, and a finger of the arm/hand pressing an ink icon that is being displayed on the display screen of the handheld computing device.

The central computing device will remain in the remote annotation mode for as long as the audience member maintains the device annotating posture and points it at the public display device. Whenever the remote annotation mode is enabled and the audience member changes where on the public display device their device annotating posture is being pointed, the skeletal tracking application will operate cooperatively with the audience-oriented object sensing device to track these changes and the central computing device will draw one or more annotation marks (such as arrows, lassos, and underlines, among others) on the public display device according to these changes (thus allowing the audience member to remotely annotate the public display device). Whenever the remote annotation mode is enabled and another condition occurs where the audience member either stops forming the device annotating posture or points it away from the public display device (e.g., whenever the audience member either puts the handheld computing device down, or stops pressing their finger on the ink icon, among other things), the skeletal tracking application will operate cooperatively with the audience-oriented object sensing device to identify this condition, and the central computing device will disable the remote annotation mode and remove the annotation marks from the public display device.

It is noted that rather than the device annotating posture being formed uni-manually (i.e., with the same hand that is holding the touch-enabled handheld computing device being used to press the ink icon) as just described, an alternate embodiment of the information sharing democratization technique described herein is also possible where the device annotating posture is formed bi-manually (i.e., with a different hand than the one that is holding the handheld computing device being used to press the ink icon).

1.3.4 Gesturing with Pointing and Touch

Figures 5A, 5B, 5C:
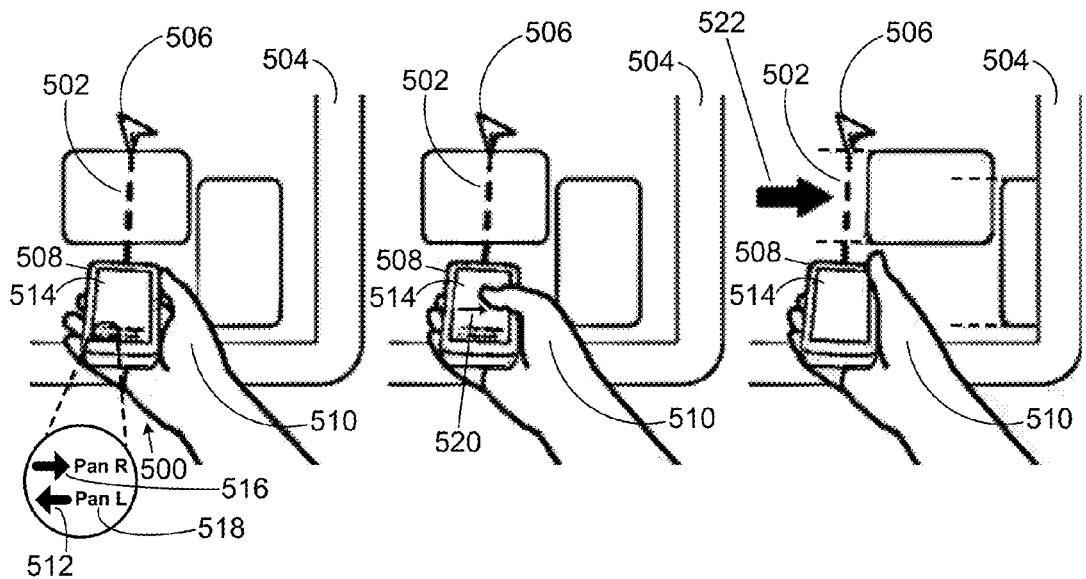
FIGS. 5A-5C are diagrams illustrating an exemplary embodiment, in simplified form, of an information sharing democratization technique for allowing a meeting audience member to remotely execute actions on the public display device or remotely execute commands in an application that is running on a central computing device.

FIGS. 5A-5C illustrate an exemplary embodiment, in simplified form, of an information sharing democratization technique for allowing an audience member to remotely execute actions on the public display device or remotely execute commands in an application that is running on the central computing device. As will be appreciated from the more detailed description that follows, this particular technique embodiment is advantageous since it prevents accidental command execution due to misinterpreted in-air gestures, and provides tactile response to the audience member.

As exemplified in FIG. 5A, whenever a condition occurs where an audience member who is using a touch-enabled handheld computing device 508 forms the device pointing posture 500 with this device and remotely points 502 this posture at the public display device 504, the skeletal tracking application running on the central computing device will operate cooperatively with the audience-oriented object sensing device to identify this condition, and the central computing device will enable the device pointing mode and display the location indicator 506 on the public display device, where the position of the location indicator on the public display device corresponds to where this posture is being pointed. The central computing device will also instruct the handheld computing device 508 being held in the audience member's hand 510 to enable the device pointing mode. The central computing device and handheld computing device 508 will remain in the device pointing mode, and the central computing device will continue to display the location indicator 506 on the public display device 504, for as long as the audience member maintains the device pointing posture 500 and points 502 it at the public display device.

Referring again to FIG. 5A, whenever the device pointing mode is enabled and another condition occurs where the audience member maintains the device pointing posture 500 and continues to remotely point 502 it at the public display device 504 for a prescribed period of time (e.g., two seconds), the skeletal tracking application will operate cooperatively with the audience-oriented object sensing device to identify this condition, and the central computing device will transmit a command to the handheld computing device 508 instructing it to display a touch gesture disclosure overlay 512 on its display screen 514. It will be appreciated that this overlay, and the other overlays described hereafter, can be implemented in various ways. In an exemplary embodiment of the information sharing democratization technique describe herein these overlays are implemented as semi-transparent overlays. Upon receiving this command from the central computing device, the handheld computing device 508 will display this overlay 512 on its display screen 514.

Referring again to FIG. 5A, the touch gesture disclosure overlay 512 includes one or more different graphical icons 516 each of which discloses a different rectilinear, mark-based touch gesture that is allowed to be performed by the audience member on the display screen 514 of the touch-enabled handheld computing device 508. The overlay 512 can also include text 518 that is displayed alongside each graphical icon 516, where this text discloses a particular action or command that is associated with each touch gesture. The overlay 512 can optionally also disclose a first spatial operand (not shown) which allows the audience member to select a particular spatial location on the public display device.

It will be appreciated that many different rectilinear, mark-based touch gestures and associated actions/commands are possible. Generally speaking, whenever the device pointing mode is enabled and the second meeting attendee performs an allowed touch gesture on the display screen of the handheld computing device, the handheld computing device will transmit a command to the central computing device that is associated with this touch gesture. Upon receiving this command from the handheld computing device the central computing device will execute the command. By way of example but not limitation and as exemplified in FIGS. 5B and 5C, whenever the audience member performs a pan-right touch gesture 520 on the display screen 514 of the handheld computing device 508, the handheld computing device will transmit a pan-right command to the central computing device. Upon receiving the pan-right command, the central computing device will pan 522 the information that is displayed on the public display device 504 to the right. Similarly, whenever the audience member performs a pan-left touch gesture (not shown) on the display screen of the handheld computing device, the handheld computing device will transmit a pan-left command to the central computing device. Upon receiving the pan-left command, the central computing device will pan the information that is displayed on the public display device to the left.

Generally speaking, the pan-right and pan-left touch gestures can be implemented using any type of rectilinear, mark-based touch gesture that is recognizable by the gesture identification application, and can be differentiated from the other touch gestures described herein. By way of example but not limitation, in the particular information sharing democratization technique embodiment exemplified in FIG. 5B the pan-right touch gesture 520 is implemented as a flick-right touch gesture (and correspondingly the pan-left touch gesture would be implemented as a flick-left touch gesture).

Whenever the device pointing mode is enabled, the audience member can employ other rectilinear, mark-based touch gestures to execute a variety of commands in an application that is running on the central computing device. It is noted that the rectilinear, mark-based touch gestures (such as the pan-right touch gesture, or the pan-left touch gesture, among others) can be performed either uni-manually (i.e., with the same hand that is holding the touch-enabled handheld computing device) or bi-manually (i.e., with a different hand than the one that is holding the handheld computing device).

1.4 Sharing Information Objects

This section describes exemplary embodiments of information sharing democratization techniques for allowing the meeting attendees to either permanently or temporarily transfer copies of information objects between the public display device and a given touch-enabled portable personal computing device, and between two different touch-enabled portable personal computing devices.

1.4.1 Transferring Information Objects with Pointing and Touch

In an exemplary embodiment of the information sharing democratization technique described herein an audience member who is using a touch-enabled handheld computing device can remotely transfer (i.e., "pull") a copy of an information object from the public display device to the handheld computing device in the following manner. Whenever the device pointing mode is enabled on the central computing device and handheld computing device as described heretofore, and the audience member remotely points their device pointing posture at a particular information object that is displayed on the public display device, and whenever they then perform an information-pull touch gesture on the display screen of their handheld computing device, the handheld computing device will transmit an information-pull command to the central computing device, where this command requests that a copy of the particular information object be transferred to the handheld computing device. Upon receiving this command from the handheld computing device, the central computing device will transmit a copy of the particular information object to the audience member's handheld computing device. Generally speaking, the information-pull touch gesture can be implemented using any type of rectilinear, mark-based touch gesture that is recognizable by the gesture identification application, and can be differentiated from the other touch gestures described herein. By way of example but not limitation, in an exemplary embodiment of the information sharing democratization technique described herein the information-pull touch gesture is implemented as a flick-downward (i.e., away from the public display device) touch gesture. It is noted that the flick-downward touch gesture can be performed either uni-manually or bi-manually.

After the copy of the particular information object has been received by the audience member's touch-enabled handheld computing device, a scaled-down version of the information object will be displayed on the handheld computing device's display screen at the approximate location where the information-pull touch gesture was performed. At this point, the audience member can stop forming the device pointing posture and can locally interact with the copy of the information object on their handheld computing device at their leisure. A context menu can optionally also be displayed on the handheld computing device's display screen, where this menu informs the audience member of the various operations they can perform on the information object. Exemplary operations can include editing the information object, saving, and deleting it, among others. The audience member can also locally manipulate the information object on their handheld computing device in other ways. By way of example but not limitation, the audience member can perform conventional pinch touch gestures to resize the information object. It will be appreciated that the context menu can be implemented in various ways. In an exemplary embodiment of the information sharing democratization technique describe herein the context menu is implemented as a semi-transparent overlay.

Figures 6A, 6B, 6C:
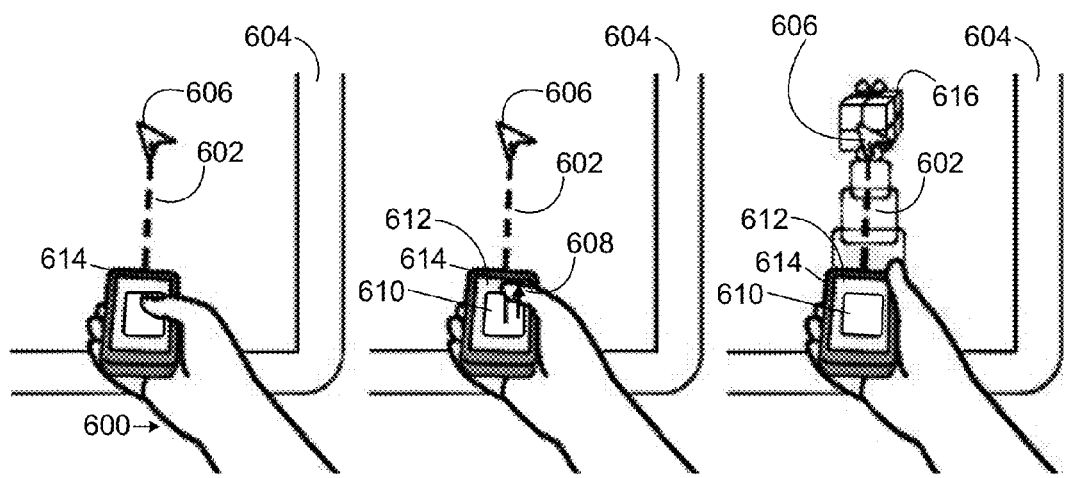
FIGS. 6A-6C are diagrams illustrating an exemplary embodiment, in simplified form, of an information sharing democratization technique for allowing a meeting audience member who is using a touch-enabled handheld computing device to remotely transfer a copy of an information object from the handheld computing device to the public display device.

FIGS. 6A-6C illustrate an exemplary embodiment, in simplified form, of an information sharing democratization technique for allowing an audience member who is using a touch-enabled handheld computing device to remotely transfer (i.e., "push") a copy of an information object from the handheld computing device to the public display device. As exemplified in FIG. 6A and described heretofore, whenever the audience member forms the device pointing posture 600 with the handheld computing device 614 and remotely points 602 this posture at the public display device 604, the device pointing mode will be enabled on the central computing device and handheld computing device, and the central computing device will display the location indicator 606 on the public display device, where the position of the location indicator on the public display device corresponds to where this posture is being pointed. As exemplified in FIG. 6B, whenever the device pointing mode is enabled and the audience member remotely points their device pointing posture at a desired location on the public display device, and they then perform an information-push touch gesture 608 on a particular information object 610 that is displayed on the display screen 612 of their handheld computing device 614, the handheld computing device will transmit a copy of the information object to the central computing device.

Generally speaking and referring again to FIG. 6B, the information-push touch gesture 608 can be implemented using any type of rectilinear, mark-based touch gesture that is recognizable by the gesture identification application and can be differentiated from the other touch gestures described herein. By way of example but not limitation, in the particular technique embodiment exemplified in FIG. 6B the information-push touch gesture 608 is implemented as a flick-upward (i.e., towards the public display device) touch gesture. It is noted that the information-push touch gesture can be performed either uni-manually or bi-manually.

After the copy of the information object has been received from the handheld computing device by the central computing device, the following things can happen. In one embodiment of the information sharing democratization technique described herein the central computing device will display a scaled-down version of the information object on the public display device, where the information object will be positioned on the public display device at the location of the location indicator at the time the audience member performed the information-push touch gesture. At this point the audience member can stop forming the device pointing posture, and any presenter can locally interact with this information object on the public display device at their leisure. This particular embodiment generally suffices in small group meeting situations, or in situations where the meeting attendees already know each other, since conventional social protocol will dictate permissions for when it is acceptable for an given audience member to transfer a copy of an information object to the public display device.

In large group meeting situations, or in situations where the meeting attendees don't know each other, the following alternate embodiment of the information sharing democratization technique described herein is possible which is based on a "package metaphor" mode that can be selectively enabled and subsequently disabled on the central computing device by a responsible person. As exemplified in FIGS. 6B and 6C, whenever the package metaphor mode is enabled, after the copy of the information object 610 has been received from the handheld computing device by the central computing device, the central computing device will display an icon 616 on the public display device 604 at the location of the location indicator 606 at the time the audience member performed the information-push touch gesture 608, where this icon serves as a surrogate for the information object. This icon 616 is hereafter simply referred to as a "package icon." The package icon 616 can optionally include a first text label (not shown) that specifies which audience member transferred the copy of the information object to the public display device. Whenever the audience member transfers copies of a plurality of information objects in sequence from their touch-enabled handheld computing device to a public display device, the plurality of information objects will be represented by a single package icon (i.e., the plurality of information objects will be grouped into a single "package") which will include a second text label that specifies the number of different information objects that were transferred. Any presenter can locally interact with the package icon 616 on the public display device at their leisure in various ways including, but not limited to, the following.

Figures 7A, 7B, 7C:
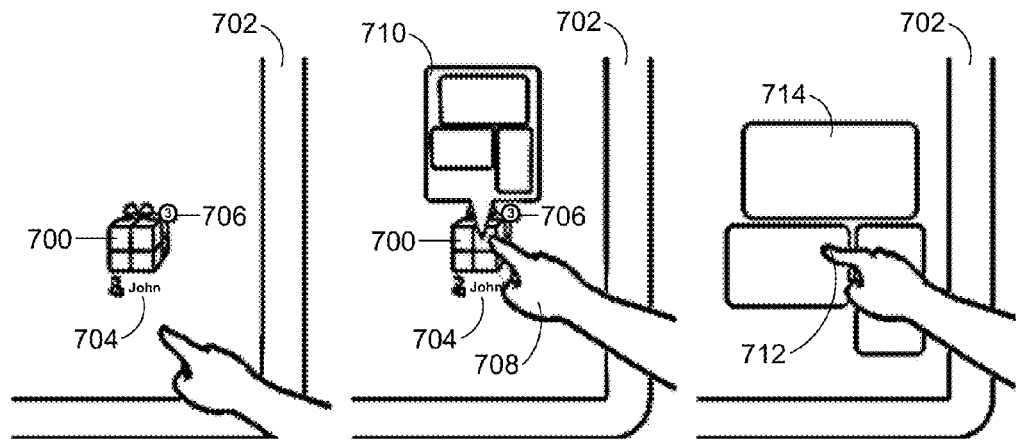
FIGS. 7A-7C are diagrams illustrating an exemplary embodiment, in simplified form, of an information sharing democratization technique for allowing a meeting presenter to locally interact with information objects that were previously transferred to a touch-enabled public display device by a meeting audience member.

FIGS. 7A-7C illustrate an exemplary embodiment, in simplified form, of an information sharing democratization technique for allowing a presenter to locally interact with information objects that were previously transferred to the public display device by an audience member. As exemplified in FIG. 7A, a package icon 700 is displayed on the public display device 702, where the package icon includes a first text label 704 that specifies which audience member (in this case John) transferred the information objects to the public display device, and a second text label 706 that specifies the number of different information objects (in this case 3) that were transferred.

As exemplified in FIG. 7B, whenever a condition occurs where the presenter hovers their hand 708 over the package icon 700 for a prescribed period of time (e.g., two seconds), the skeletal tracking application running on the central computing device will operate cooperatively with the presenter-oriented object sensing device to identify this condition, and a scaled-down preview version 710 of the one or more information objects that were transferred to the public display device 702 will be revealed to the presenter. Whenever another condition occurs where the presenter stops hovering their hand 708 over the package icon 700, the scaled-down preview version 710 of the information objects will stop being revealed. As exemplified in FIG. 7C, whenever the presenter taps 712 on the package icon, the one or more information objects 714 represented by the icon will be displayed on the public display device so these information objects can be publically viewed by the audience members.

In another exemplary embodiment of the information sharing democratization technique described herein an audience member who is using either a tablet computer or touch-enabled laptop computer (hereafter collectively simply referred to as a touch-enabled non-handheld computing device) can remotely transfer (i.e., push) a copy of an information object from the non-handheld computing device to the public display device in the following manner. Whenever another condition occurs where the audience member forms the remote location indicator posture using one of their arms and remotely points this posture at a desired location on the public display device, the skeletal tracking application will operate cooperatively with the audience-oriented object sensing device to identify this condition and also identify that the audience member who is forming this posture is using the non-handheld computing device. The central computing device will then enable the remote location indicator mode and display the location indicator on the public display device, where the position of the location indicator on the public display device corresponds to where this posture is being pointed. The audience member can thus use the remote location indicator posture to remotely and precisely point at either a desired location on the public display device or a particular information object that is being displayed on the public display device.

The central computing device will also transmit a command to the non-handheld computing device being used by the audience member instructing it to enable the remote location indicator mode. Upon receiving this command from the central computing device, the non-handheld computing device can optionally display the touch gesture disclosure overlay on its display screen (which serves as a visual indication to the audience member that their non-handheld computing device is now in the remote location indicator mode). The central computing device and non-handheld computing device will remain in the remote location indicator mode, and the central computing device will continue to display the location indicator on the public display device, for as long as the audience member maintains the remote location indicator posture and points it at the public display device.

Generally speaking, whenever the remote location indicator mode is enabled and the audience member performs an allowed touch gesture on the display screen of their non-handheld computing device, the non-handheld computing device will transmit a command to the central computing device that is associated with this touch gesture. Upon receiving this command from the non-handheld computing device, the central computing device will execute the command. By way of example but not limitation, whenever the audience member uses their other arm to perform the information-push touch gesture on a particular information object that is displayed on the display screen of their non-handheld computing device, the non-handheld computing device will transmit a copy of the information object to the central computing device. After the copy of the information object has been received from the non-handheld computing device by the central computing device, in one embodiment of the information sharing democratization technique described herein the central computing device will display a scaled-down version of the information object on the public display device, and any presenter can interact with this information object as described heretofore. In an alternate embodiment of the information sharing democratization technique where the package metaphor mode has been enabled, the central computing device will display the package icon representing the information object on the public display device, and any presenter can interact with this package icon as also described heretofore.

Figures 8A, 8B, 8C:
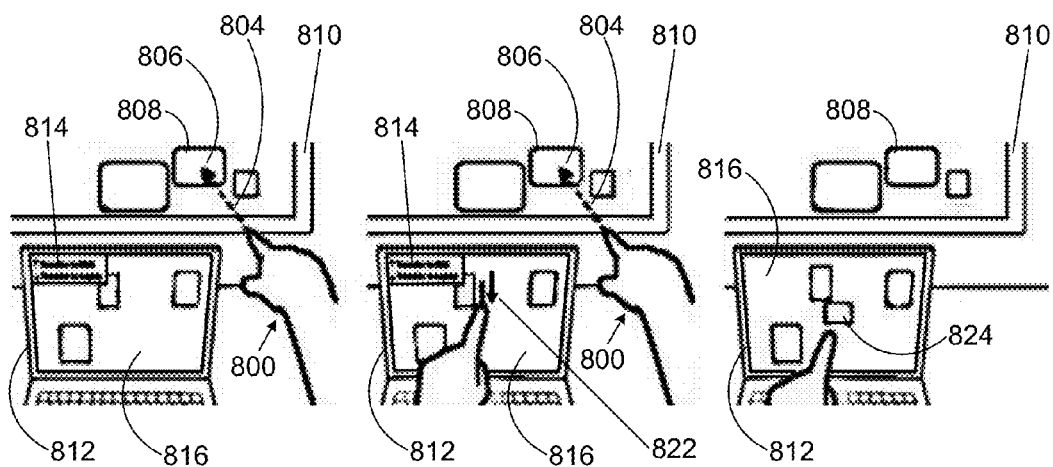
FIGS. 8A-8C are diagrams illustrating an exemplary embodiment, in simplified form, of an information sharing democratization technique for allowing a meeting audience member who is using either a tablet computer or a touch-enabled laptop computer to remotely transfer a copy of an information object from the public display device to the tablet/laptop computer.

FIGS. 8A-8C illustrate an exemplary embodiment, in simplified form, of an information sharing democratization technique for allowing an audience member who is using a touch-enabled non-handheld computing device to remotely transfer (i.e., pull) a copy of an information object from the public display device to the non-handheld computing device. As exemplified in FIG. 8A, whenever another condition occurs where the audience member forms the remote location indicator posture 800 and remotely points 804 this posture at the public display device 810, the skeletal tracking application will operate cooperatively with the audience-oriented object sensing device to identify this condition and also identify that the audience member who is forming this posture is using the non-handheld computing device 812. The central computing device will then enable the remote location indicator mode and display the location indicator 806 on the information object 808 as described heretofore. The central computing device will also transmit a command to the non-handheld computing device 812 being used by the audience member instructing it to enable the remote location indicator mode. Upon receiving this command from the central computing device, the non-handheld computing device 812 can optionally display the touch gesture disclosure overlay 814 on its display screen 816.

As exemplified in FIG. 8B, whenever the remote location indicator mode is enabled and the audience member remotely points 804 the remote location indicator posture 800 at a particular information object 808 that is displayed on the public display device 810, and they then perform the information-pull touch gesture 822 on the display screen 816 of their non-handheld computing device 812, the non-handheld computing device will transmit an information-pull command to the central computing device, where this command requests that a copy of the particular information object be transferred to the non-handheld computing device. Upon receiving this command from the non-handheld computing device 812, the central computing device will transmit a copy of the particular information object 808 to the non-handheld computing device. As exemplified in FIG. 8C, after the copy of the information object 808 has been received by the non-handheld computing device 812, a scaled-down version of the information object 824 will be displayed will be displayed on the non-handheld computing device's display screen 816 at the approximate location where the information-pull touch gesture was performed. At this point, the audience member can stop forming the remote location indicator posture 800 and can locally interact with the copy of the information object on their non-handheld computing device 812 at their leisure. The context menu (not shown) can optionally also be displayed on the non-handheld computing device's display screen 816, where this menu informs the audience member of the various operations they can perform on the information object 824. The audience member can also locally manipulate the information object 824 in other ways including, but not limited to, performing conventional pinch touch gestures (not shown) to resize the information object.

1.4.2 Transient Sharing with Pointing and Accelerometers

This section describes exemplary embodiments of information sharing democratization techniques for allowing an audience member to briefly (i.e., transiently) show an information object to the rest of the meeting attendees (e.g., the equivalent of the audience member briefly holding up a piece of paper to the rest of the meeting attendees). This capability can be useful in various group meeting scenarios including, but not limited to, the following. Consider a scenario where a project team is holding a group meeting to discuss a project they are working on and a question or problem arises during the meeting. One of the audience members may use their touch-enabled portable personal computing device during the meeting to work on producing an answer or solution. Once they have produced an answer or solution, they can publically share it with the rest of the meeting attendees.

Figures 9A, 9B:
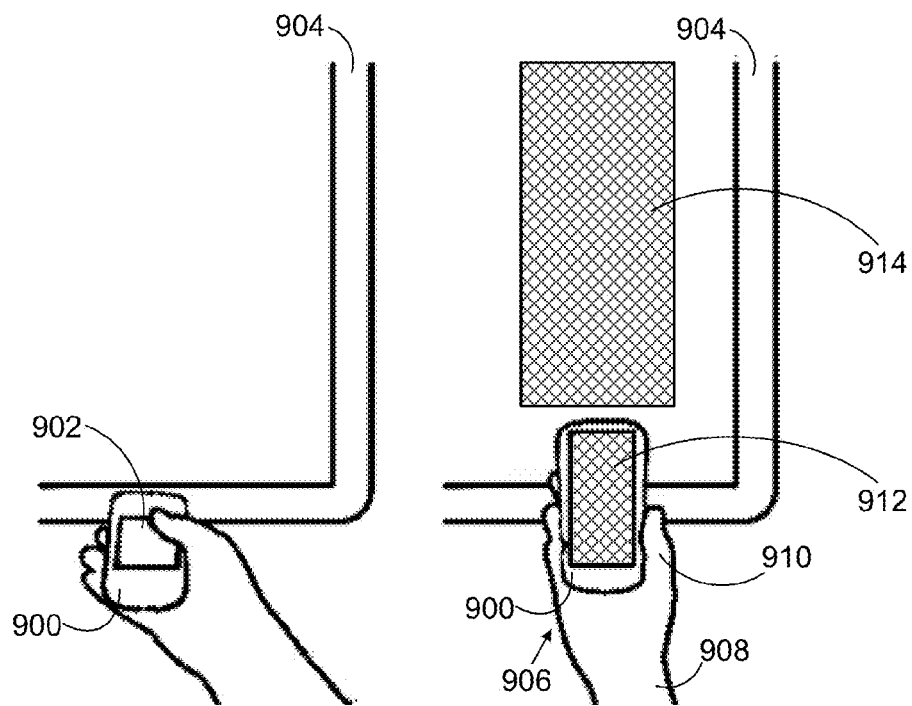
FIGS. 9A and 9B are diagrams illustrating an exemplary embodiment, in simplified form, of an information sharing democratization technique for allowing a meeting audience member who is using a handheld computing device to transiently and publically share the current contents of its display screen with all the other meeting attendees.

FIGS. 9A and 9B illustrate an exemplary embodiment, in simplified form, of an information sharing democratization technique for allowing an audience member who is using a handheld computing device to transiently and publically share the current contents of its display screen with all the other meeting attendees. As exemplified in FIG. 9A, whenever the audience member is "normally" using the handheld computing device 900 the contents of its display screen 902 is kept private to the audience member (i.e., these contents are not displayed on the public display device 904). As exemplified in FIG. 9B, whenever a condition occurs where the audience member forms a device sharing posture 906 with the handheld computing device 900 and remotely points this posture at the public display device 904, the following things will happen. The skeletal tracking application running on the central computing device will operate cooperatively with the audience-oriented object sensing device to identify this condition, a physical orientation sensing device included within the handheld computing device 900 (e.g., an accelerometer, or the combination of an accelerometer and a gyroscope, or the combination of an accelerometer and a gyroscope and a magnetometer) will sense that the handheld computing device is in a prescribed spatial orientation, both the central computing device and handheld computing device will enable a transient sharing mode, and the handheld computing device will transmit a copy of the current contents of its display screen 912 to the central computing device.

Generally speaking and referring again to FIG. 9B, the device sharing posture 906 can be implemented using any type of posture that involves the audience member holding the handheld computing device 900, and is recognizable by the combination of the audience-oriented object sensing device and skeletal tracking application, and is differentiable from the other postures describe herein. By way of example but not limitation, in the particular technique embodiment exemplified in FIG. 9B the device sharing posture 906 is implemented as an arm 908 of the audience member being extended away from their body with the handheld computing device 900 being held in the hand 910 of the arm such that the handheld computing device is approximately perpendicular to the floor of the meeting space. As such, in this particular technique embodiment the prescribed spatial orientation is the handheld computing device being approximately perpendicular to the floor of the meeting space. The handheld computing device 900 can be held in either a portrait screen orientation (as exemplified in FIG. 9B) or landscape screen orientation (not shown). Alternate embodiments of the information sharing democratization technique described herein are possible where the screen orientation of the handheld computing device can be used for different purposes such as determining a default action or a particular mode of use.

Referring again to FIG. 9B, after the copy of the current contents of the handheld computing device's display screen 912 have been received from the handheld computing device by the central computing device, the central computing device will display these contents in the form of an overlay 914 on the public display device 904. The central computing device and handheld computing device 900 will remain in the transient sharing mode, and the central computing device will continue to display the overlay 914 on the public display device 904, for as long as the audience member maintains the device sharing posture 906 and points it at the public display device. Whenever the central computing device and handheld computing device are in the transient sharing mode, the handheld computing device 900 will transmit any changes in the contents of its display screen 912 to the central computing device, and the central computing device will accordingly update the overlay 914 with these changes. Thus, the current contents of the handheld computing device's display screen 912 will be shared transiently with all of the meeting attendees for as long as the audience member continues to form the device sharing posture 906.

Referring again to FIG. 9B, whenever the transient sharing mode is enabled and another condition occurs where the audience member either stops forming the device sharing posture 906 or points it away from the public display device 904 (e.g., whenever the audience member puts the handheld computing device down, among other things), the skeletal tracking application will operate cooperatively with the audience-oriented object sensing device to identify this condition, the central computing device and handheld computing device 900 will disable the transient sharing mode, and the central computing device will remove the overlay 914 from the public display device 904. During the time the overlay 914 is displayed on the public display device 904, a presenter (not shown) can make the overlay a permanent part of the public display device in the following manner. Whenever this presenter touches the overlay and touch-drags it in any direction along the public display device, the gesture identification application that is running on the central computing device will identify this touch-dragging activity, and transform the overlay into a scaled-down version thereof, and replace the overlay with this scaled-down version, and move the location of this scaled-down version on the public display device based on this touch-dragging activity.

In another exemplary embodiment of the information sharing democratization technique described herein an audience member who is using a touch-enabled non-handheld computing device can transiently and publically share the current contents of its display screen with all the other meeting attendees in the following manner. Whenever another condition occurs where the audience member forms the remote dragging posture and remotely points this posture at the public display device, the skeletal tracking application will operate cooperatively with the audience-oriented object sensing device to identify this condition and also identify that the audience member who is forming this posture is using the non-handheld computing device. The central computing device will then enable the transient sharing mode, and will also transmit a command to the non-handheld computing device being used by the audience member instructing it to enable the transient sharing mode. Whenever the transient sharing mode is enabled and the audience member touches the display screen of their non-handheld computing device, the non-handheld computing device will transmit a copy of the current contents of its display screen to the central computing device. After the copy of the current contents of the non-handheld computing device's display screen have been received from the non-handheld computing device by the central computing device, the central computing device will display these contents in the form of an overlay on the public display device.

The central computing device and touch-enabled non-handheld computing device will remain in the transient sharing mode, and the central computing device will continue to display the overlay on the public display device, for as long as the audience member maintains the remote dragging posture and points it at the public display device. Whenever the transient sharing mode is enabled, the non-handheld computing device will transmit any changes in the contents of its display screen to the central computing device, and the central computing device will accordingly update the overlay with these changes. Thus, the current contents of the non-handheld computing device's display screen will be shared transiently with all of the meeting attendees for as long as the audience member continues to form the remote dragging posture and points it at the public display device. Whenever the transient sharing mode is enabled and another condition occurs where the audience member either stops forming the remote dragging posture or points it away from the public display device, the skeletal tracking application will operate cooperatively with the audience-oriented object sensing device to identify this condition, the central computing device and non-handheld computing device will disable the transient sharing mode, and the central computing device will remove the overlay from the public display device. During the time the overlay is displayed on the public display device, a presenter can make the overlay a permanent part of the public display device in the in the manner just described.

1.4.3 Peer-To-Peer Transferring of Information Objects

This section describes exemplary embodiments of information sharing democratization techniques for allowing the meeting attendees to transfer a copy of an information object from the personal computing device of one meeting attendee to the personal computing device of another meeting attendee. It will be appreciated that this information transfer can be made either from one audience member to another, or from an audience member to a presenter, or vice versa.

In one embodiment of the information sharing democratization technique described herein a first audience member who is using a touch-enabled non-handheld computing device can remotely transfer (i.e., push) a copy of an information object from the non-handheld computing device to a personal computing device that is associated with a second audience member in the following manner. Whenever a condition occurs where the first audience member forms the remote location indicator posture and remotely points this posture at the second audience member, the skeletal tracking application running on the central computing device will operate cooperatively with the audience-oriented object sensing device to identify this condition, identify that the first audience member who is forming this posture is using the non-handheld computing device, identify the second audience member, and identify the personal computing device that is associated with the second audience member. This association between the personal computing device and second audience member can be established in various ways. By way of example but not limitation, the association can be programmed into a user profile for the second audience member on the central computing device. The association can also be established by sensing the physical location of each of the personal computing devices and each of the meeting attendees in the meeting space, and then associating a given meeting attendee with the personal computing device(s) that is within a prescribed distance (e.g., three feet) thereof. The central computing device will also enable a peer-to-peer transfer mode and will remain in this mode for as long as the first audience member maintains the remote location indicator posture and points it at the second audience member.

Whenever the peer-to-peer transfer mode is enabled, the first audience member can perform the information-push touch gesture on a particular information object that is displayed on the display screen of their touch-enabled non-handheld computing device, which will cause the non-handheld computing device to transmit a copy of the information object to the central computing device. Upon receiving the copy of the information object from the non-handheld computing device, the central computing device will forward it to the personal computing device that is associated with the second audience member. After the copy of the information object has been received by this personal computing device, it can display a package icon on its display screen which serves as a surrogate for the information object. The package icon can optionally include a text label which specifies that the information object was received from the first audience member. The second audience member can then tap on the package icon at their leisure to display the information object represented by the icon. Whenever the peer-to-peer transfer mode is enabled and another condition occurs where the first audience member either stops forming the remote location indicator posture or points it away from the second audience member, the skeletal tracking application will operate cooperatively with the audience-oriented object sensing device to identify this condition, and the central computing device will disable the peer-to-peer transfer mode.

In another embodiment of the information sharing democratization technique described herein a third audience member who is using a touch-enabled handheld computing device can remotely transfer (i.e., push) a copy of an information object from the handheld computing device to the personal computing device that is associated with the second audience member in the following manner. Whenever another condition occurs where the third audience member forms the device pointing posture with the handheld computing device and remotely points this posture at the second audience member, the skeletal tracking application will operate cooperatively with the audience-oriented object sensing device to identify this condition, identify that the third audience member who is forming this posture is using the handheld computing device, identify the second audience member, and identify the personal computing device that is associated with the second audience member. The central computing device will also enable the peer-to-peer transfer mode and will remain in this mode for as long as the third audience member maintains the device pointing posture and points it at the second audience member.

Whenever the peer-to-peer transfer mode is enabled, the third audience member can perform the information-push touch gesture on a particular information object that is displayed on the display screen of the handheld computing device, which will cause the handheld computing device to transmit a copy of the information object to the central computing device. Upon receiving the copy of the information object from the handheld computing device, the central computing device will forward it to the personal computing device that is associated with the second audience member. After the copy of the information object has been received by this personal computing device, it will display the package icon on its display screen which serves as a surrogate for the information object. The second audience member can then tap on the package icon at their leisure to display the information object represented by the icon. Whenever the peer-to-peer transfer mode is enabled and another condition occurs where the third audience member either stops forming the remote location indicator posture or points it away from the second audience member, the skeletal tracking application will operate cooperatively with the audience-oriented object sensing device to identify this condition, and the central computing device will disable the peer-to-peer transfer mode. It is noted that the information-push touch gesture can be performed either uni-manually (e.g., with the same hand that is holding the handheld computing device) or bi-manually (e.g., with a different hand than the one that is holding the handheld computing device).

In addition to the two different information sharing democratization technique embodiments for allowing one audience member to transfer a copy of an information object to another audience member that were just described, an alternate embodiment of the information sharing democratization technique described herein is also possible where the information transfer can take place between an audience member and a presenter. In this case the skeletal tracking application will operate cooperatively with both the audience-oriented and presenter-oriented object sensing devices to perform the various identification operations just described. Another alternate embodiment of the information sharing democratization technique is also possible where the information transfer can take place between two different presenters. In this case the skeletal tracking application will operate cooperatively with just the presenter-oriented object sensing device to perform the various identification operations just described. In a situation where the two meeting attendees involved in the information transfer are directly next to one another, it will be appreciated that it may be infeasible for one meeting attendee to point at the other meeting attendee. In this situation conventional methods which are intended to support very short-range sharing of information objects can be used to allow one meeting attendee to transfer a copy of an information object to the other meeting attendee. Examples of such conventional methods include the Bump application for smartphones, the stitching method which uses pen gestures that span a plurality of displays, and the pick-and-drop method, among others.

1.4.4 Transferring Information Objects from Public Display Device to Audience

This section describes exemplary embodiments of information sharing democratization techniques for allowing a presenter to transfer a copy of an information object that is displayed on the public display device to one or more audience members.

In one embodiment of the information sharing democratization technique described herein a presenter can remotely transfer (i.e., push) a copy of an information object that is displayed on the public display device to a personal computing device that is associated with a particular audience member in the following manner. Whenever a condition occurs where the presenter forms the remote location indicator posture using one of their hands and remotely points this posture at the particular audience member, the skeletal tracking application running on the central computing device will operate cooperatively with both the audience-oriented object sensing device and presenter-oriented object sensing device to identify this condition, identify the particular audience member, and identify the personal computing device that is associated with the audience member, where this association has been previously programmed into a user profile for the audience member on the central computing device. The central computing device will also enable a presenter-to-audience-member transfer mode and will remain in this mode for as long as the presenter maintains the remote location indicator posture and points it at the audience member. Whenever the presenter-to-audience-member transfer mode is enabled and another condition occurs where the presenter either stops forming the remote location indicator posture or points it away from the audience member, the skeletal tracking application will operate cooperatively with both the audience-oriented and presenter-oriented object sensing devices to identify this condition, and the central computing device will disable the presenter-to-audience-member transfer mode.

Whenever the presenter-to-audience-member transfer mode is enabled and another condition occurs where the presenter maintains the remote location indicator posture which is being pointed at the particular audience member for a prescribed period of time (e.g., two seconds), and during this period of time the presenter's other hand is within a prescribed distance (e.g., two meters) of the public display device's display screen, the skeletal tracking application will operate cooperatively with both the audience-oriented and presenter-oriented object sensing devices to identify this condition, and the central computing device will display a first touch gesture disclosure overlay around the presenter on the public display device, where this overlay includes one or more different graphical icons each of which discloses a different rectilinear, mark-based touch gesture that is allowed to be performed by the presenter on the public display device's display screen. This overlay can also include text that is displayed alongside each graphical icon, where this text discloses a particular action or command that is associated with each touch gesture. Whenever the presenter-to-audience-member transfer mode is enabled, the presenter can perform the information-push touch gesture on an information object that is displayed on the display screen of the public display device, which will cause the central computing device to transmit a copy of the information object to the personal computing device that is associated with the audience member.

In another embodiment of the information sharing democratization technique described herein the presenter can remotely transfer (i.e., push) a copy of an information object that is displayed on the public display device to the personal computing devices that are associated with all of the audience members in the following manner. Whenever the presenter-to-audience-member transfer mode is disabled and another condition occurs where the presenter forms the remote location indicator posture using one of their hands and remotely points this posture away from the public display device and at the floor of the meeting space, the skeletal tracking application will operate cooperatively with both the audience-oriented and presenter-oriented object sensing devices to identify this condition, identify the audience members, and identify the personal computing device that is associated with each of the audience members. The central computing device will also enable a presenter-to-entire-audience transfer mode and will remain in this mode for as long as the presenter maintains the remote location indicator posture and points it away from the public display device and at the floor. Whenever the presenter-to-entire-audience transfer mode is enabled and another condition occurs where the presenter either stops forming the remote location indicator posture or stops pointing it away from the public display device and at the floor, the skeletal tracking application will operate cooperatively with both the audience-oriented and presenter-oriented object sensing devices to identify this condition, and the central computing device will disable the presenter-to-entire-audience transfer mode.

Whenever the presenter-to-entire-audience transfer mode is enabled and another condition occurs where the presenter maintains the remote location indicator posture which is being pointed away from the public display device and at the floor for a prescribed period of time (e.g., two seconds), and during this period of time the presenter's other hand is within the prescribed distance of the public display device's display screen, the skeletal tracking application will operate cooperatively with both the audience-oriented and presenter-oriented object sensing devices to identify this condition, and the central computing device will display a second touch gesture disclosure overlay around the presenter on the public display device, where this overlay includes the aforementioned one or more different graphical icons and a visual cue indicating that any information object that is transferred from the public display device will be broadcast to all of the audience members. This overlay can also include the aforementioned text that is displayed alongside each graphical icon. Whenever the presenter-to-entire-audience transfer mode is enabled the presenter can perform the information-push touch gesture on an information object that is displayed on the public display device's display screen, which will cause the central computing device to transmit a copy of the information object to the personal computing device that is associated with each of the audience members.

1.5 Enriching Use of Public Display Device with Skeletal Tracking

This section describes exemplary embodiments of information sharing democratization techniques which enrich the experience of using the public display device for presenters.

1.5.1 Sensing Social Context

In an exemplary embodiment of the information sharing democratization technique described herein the skeletal tracking application running on the central computing device can operate cooperatively with the presenter-oriented and audience-oriented object sensing devices to identify how many presenters and how many audience members are in the meeting space at any given point in time. As will now be described in more detail, the central computing device can use this information to detect various social contexts and then assign a prescribed mode of operation based on the particular social context that is detected at a given point in time. Exemplary modes of operation include, but are not limited to, the following.

Whenever a condition occurs where there are no meeting attendees in the meeting space (i.e., there are no presenters and no audience members), the skeletal tracking application running on the central computing device will operate cooperatively with both the audience-oriented and presenter-oriented object sensing devices to identify this condition, the central computing device will enable an ambient display mode, and the central computing device will display one or more default information objects on the public display device. Exemplary default information objects include a calendar for the group meetings that are scheduled in the meeting space for the current day or week, and a list of current software bug counts for each software development team member, among others. The central computing device will remain in the ambient display mode for as long as there are no meeting attendees in the meeting space. Whenever the ambient display mode is enabled and a meeting attendee enters the meeting space, the meeting attendee can transfer (i.e., pull) a copy of a default information object from the public display device to their touch-enabled portable personal computing device in the various manners described heretofore.

Whenever the ambient display mode is enabled and another condition occurs where one or more meeting attendees enter and remain in the meeting space for a prescribed period of time (e.g., two minutes), the skeletal tracking application will operate cooperatively with both the audience-oriented and presenter-oriented object sensing devices to identify this condition, the central computing device will disable the ambient display mode, and the central computing device will remove the default information objects from the public display device. Whenever the ambient display mode is enabled and a one of the one or more meeting attendees either locally performs an allowed touch gesture on the display screen of the public display device, or remotely performs an allowed in-air gesture on this display screen, the central computing device will also disable the ambient display mode and remove the default information objects from the public display device.

Whenever another condition occurs where there is just one presenter and they are facing toward the audience (i.e., the presenter is facing away from the public display device), the skeletal tracking application will operate cooperatively with the presenter-oriented object sensing device to identify this condition, the central computing device will enable a single-speaking-presenter mode, and the central computing device will hide all user interface elements that specifically support the presenter that are currently being displayed on the public display device (such as the posture palettes described hereafter, among others). This is advantageous since the presenter is not looking at these user interface elements and they can obscure the audience's view of other information objects being displayed on the public display device. The central computing device will remain in the single-speaking-presenter mode for as long as there is just one presenter and they are facing toward the audience.

Whenever another condition occurs where there is just one presenter and they are facing toward the public display device enough to see its contents, the skeletal tracking application will operate cooperatively with the presenter-oriented object sensing device to identify this condition, the central computing device will enable a single-working-presenter mode, and the central computing device will display one or more of the aforementioned user interface elements that support the presenter. The central computing device will remain in the single-working-presenter mode for as long as there is just one presenter and they are facing toward the public display device.

Figure 10:
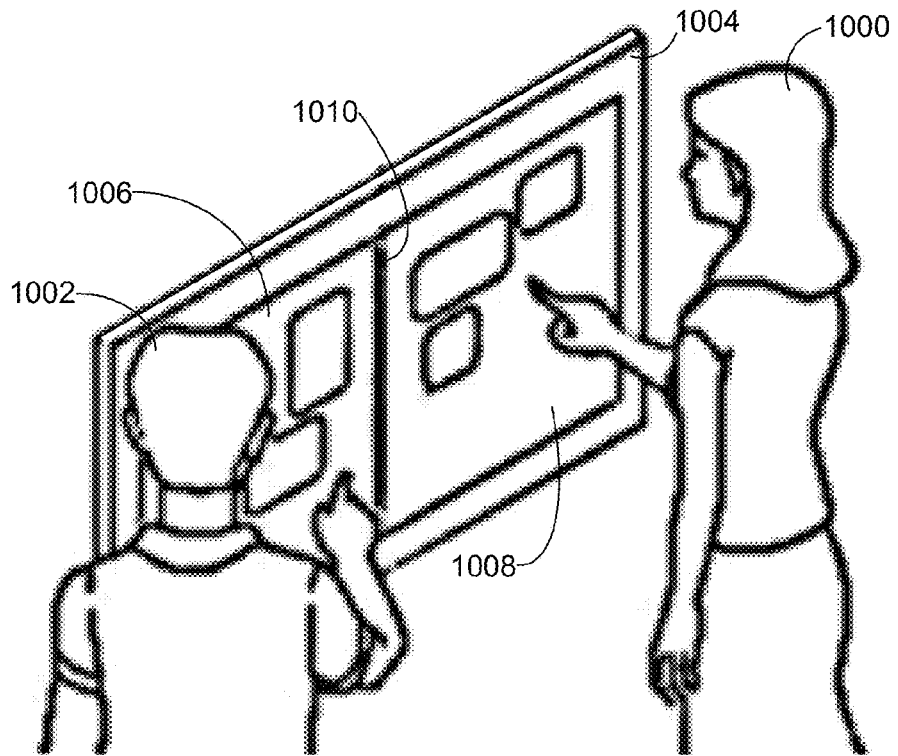
FIG. 10 is a diagram illustrating an exemplary embodiment, in simplified form, of an information sharing democratization technique for allowing two or more meeting presenters to locally, independently and concurrently manipulate the information that is displayed on the touch-enabled public display device.

FIG. 10 illustrates an exemplary embodiment, in simplified form, of an information sharing democratization technique for allowing two or more presenters to locally, independently and concurrently manipulate the information that is displayed on the public display device. As exemplified in FIG. 10, whenever another condition occurs where there are two or more presenters 1000 and 1002 and they are facing toward the public display device enough to see its contents, the skeletal tracking application will operate cooperatively with the presenter-oriented object sensing device to identify this condition, and the central computing device will enable a multi-working presenters mode which operates as follows. Whenever the multi-working presenters mode is enabled, the central computing device will segment the display screen of the public display device 1004 into a number of different regions 1006 and 1008, where this number equals a count of how many presenters 1000 and 1002 there currently are who are facing toward the public display device enough to see its contents, and each different region is positioned approximately in front of a different presenter. The central computing device will display a splitter graphical element 1010 between adjacent regions 1006 and 1008, where the splitter graphical element serves to visually depict the boundaries between the adjacent regions and communicate to all of the meeting attendees that the public display device 1004 is operating in the multi-working presenters mode.

Referring again to FIG. 10, each of the different regions 1006 and 1008 on the public display device 1004 provide the presenter that is facing toward the region the ability to independently manipulate (via touch gestures on the region) the underlying information content that was being displayed on the public display device at the time the central computing device enabled the multi-working presenters mode. As such, whenever the multi-working presenters mode is enabled a given one of the two or more presenters (e.g., presenter 1000) can perform touch gestures on the region 1008 that is in front of them to independently pan the region across the underlying information content, or open an information object that is displayed in the region, among other things. It will be appreciated that the multi-working presenters mode is advantageous since it eliminates the contention issues that can arise whenever two or more presenters want to manipulate the public display device at the same time. Whenever the multi-working presenters mode is enabled and another condition occurs where there are no longer two or more presenters that are facing toward the public display device 1004 enough to see its contents, the skeletal tracking application will operate cooperatively with the presenter-oriented object sensing device to identify this condition, the central computing device will disable the multi-working presenters mode, and the central computing device will remove the different regions 1006 and 1008 and the splitter graphical element 1010 from the public display device.

Whenever another condition occurs where there are no presenters and there are one or more audience members, the skeletal tracking application will operate cooperatively with the audience-oriented and presenter-oriented object sending devices to identify this condition, and the central computing device will enter an audience-only mode which operates as follows. Whenever the audience-only mode is enabled, and the package metaphor mode is also enabled, and the central computing device displays a package icon on the public display device (which indicates that an audience member remotely transferred (i.e., pushed) copies of one or more information objects from their portable personal computing device to the public display device as described heretofore), the central computing device will automatically display the information objects that were transferred on the public display device. This is advantageous since there is currently no presenter at the public display device who can hover their hand over or tap on the package icon as described heretofore. Whenever the audience-only mode is enabled and a presenter arrives at the public display device, the skeletal tracking application will operate cooperatively with the audience-oriented and presenter-oriented object sending devices to identify this condition, and the central computing device will disable the audience-only mode.

1.5.2 Tertiary Projected Display

Figures 11A, 11B, 11C:
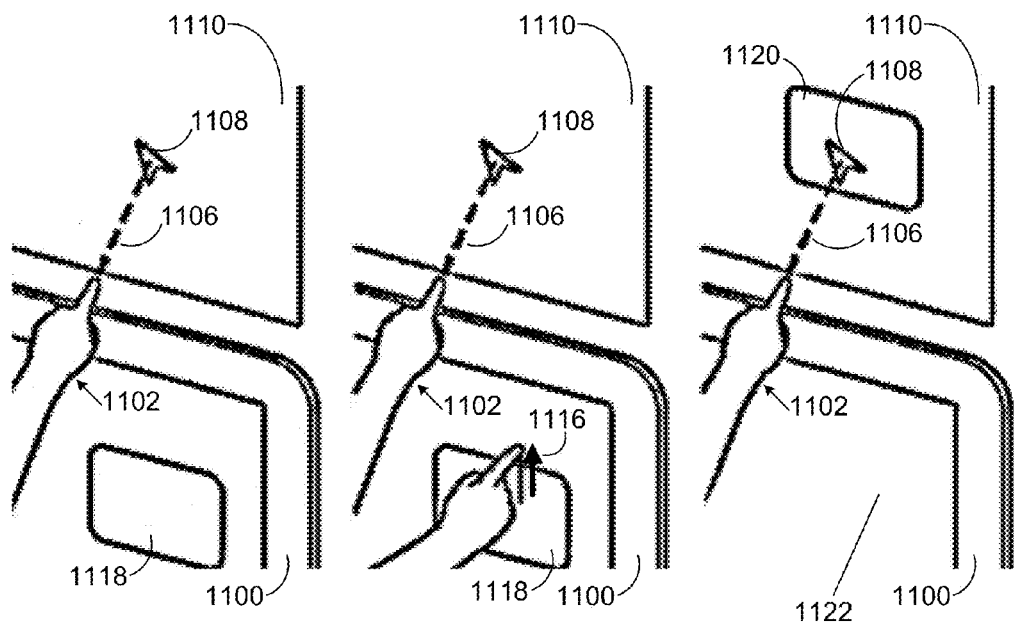
FIGS. 11A-11C are diagrams illustrating an exemplary embodiment, in simplified form, of an information sharing democratization technique for allowing a meeting presenter to transfer an information object from the touch-enabled public display device to a tertiary display region.

FIGS. 11A-11C illustrate an exemplary embodiment, in simplified form, of an information sharing democratization technique for allowing a presenter to transfer an information object from the public display device to a tertiary display region which is optically projected via an optical projection device onto a prescribed location on a tertiary surface in the meeting space that is near the public display device as described heretofore. As will be appreciated from the more detailed description that follows, this technique embodiment is advantageous since it allows the size of the public display device to be virtually expanded in an easy, low cost and flexible manner.

As exemplified in FIG. 11A, whenever a condition occurs where a presenter forms the remote location indicator posture 1102 and points 1106 this posture at the tertiary display region 1110, the skeletal tracking application running on the central computing device will operate cooperatively with the presenter-oriented object sensing device to identify this condition, and the central computing device will enable a tertiary display mode. The tertiary display application running on the central computing device will then cause the optical projection device in the meeting space to optically project the location indicator 1108 within the tertiary display region 1110, where the position of the location indicator within the tertiary display region corresponds to where the remote location indicator posture 1102 is currently being pointed 1106. The central computing device will remain in the tertiary display mode and continue to cause the optical projection device to optically project the location indicator 1108 within the tertiary display region 1110 for as long as the presenter maintains the remote location indicator posture 1102 and points 1106 it at the tertiary display region. Whenever the tertiary display mode is enabled and another condition occurs where the presenter either stops forming the remote location indicator posture 1102 or points it away from the tertiary display region 1110, the skeletal tracking application will operate cooperatively with the presenter-oriented object sensing device to identify this condition, and the central computing device will disable the tertiary display mode and cause the optical projection device to remove the location indicator from the tertiary display region.

As exemplified in FIGS. 11B and 11C, whenever the tertiary display mode is enabled and the presenter performs the information-push touch gesture 1116 on an information object 1118 that is displayed on the display screen of the public display device 1100, the tertiary display application running on the central computing device will cause the optical projection device to optically project the information object 1120 within the tertiary display region 1110 and behind the location indicator 1108, and the central computing device will remove the information object 1118 from the public display device 1100. Whenever the presenter subsequently performs the information-pull touch gesture (not shown) on the display screen 1122 of the public display device 1100, the tertiary display application will cause the projection device to remove the information object from the display region, and the central computing device will re-display the information object on the public display device.

1.5.3 Adding Content to Public Display Device with Posture Palette

Figures 12A, 12B, 12C:
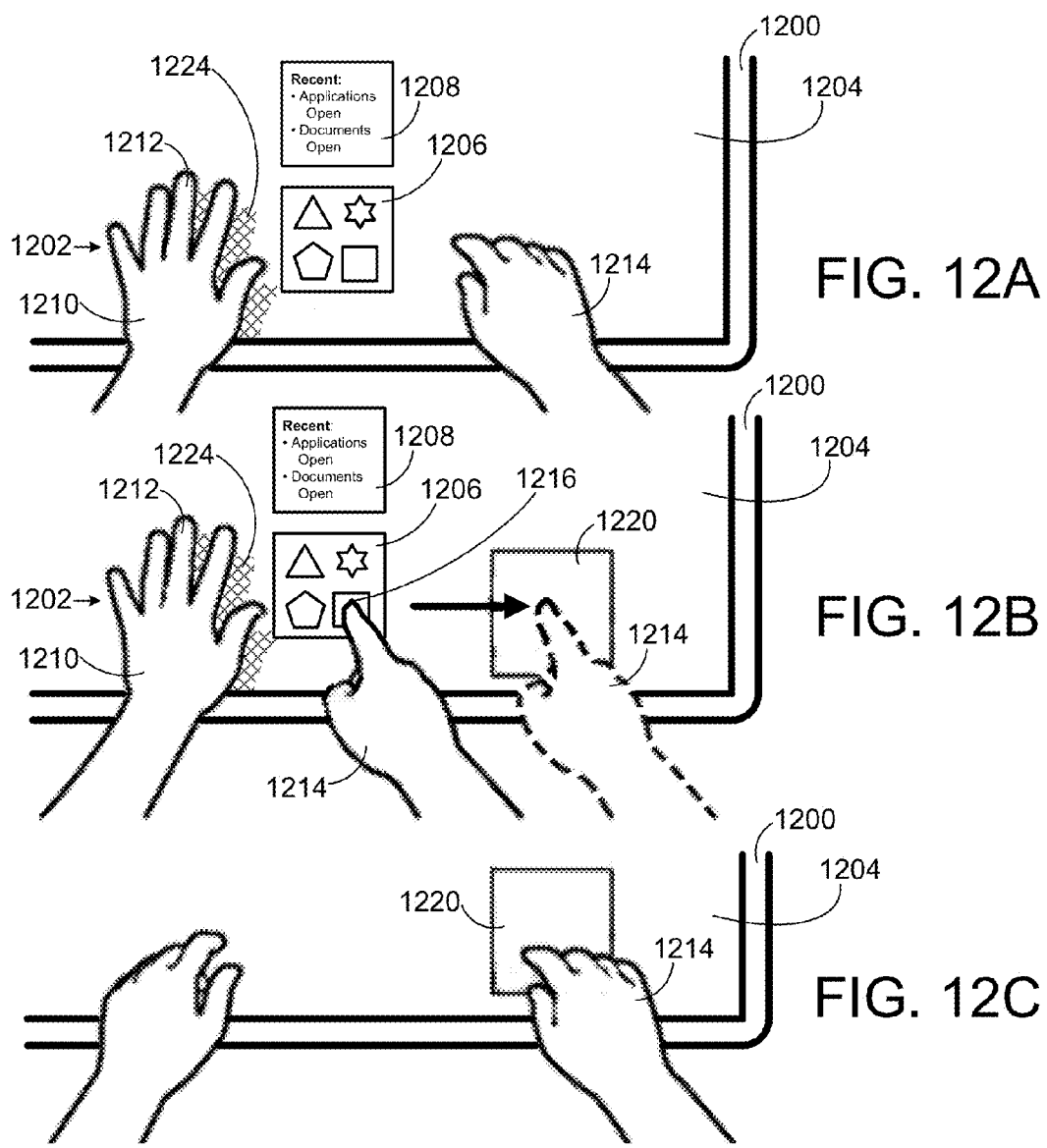
FIGS. 12A-12C are diagrams illustrating an exemplary embodiment, in simplified form, of an information sharing democratization technique for allowing a meeting presenter to add information content to the touch-enabled public display device using a posture palette.

FIGS. 12A-12C illustrate an exemplary embodiment, in simplified form, of an information sharing democratization technique for allowing a presenter to add information content to the public display device by using a posture palette. As exemplified in FIGS. 12A and 12B, the term "posture palette" is used herein to refer to a palette of graphical icons 1206 and an optional region of supporting text 1208 which are displayed on a touch-enabled public display device 1200 whenever the presenter forms a palette generating posture 1202 and hovers this posture over the display screen 1204 of the public display device for a prescribed period of time (e.g., two seconds). As will now be described in more detail, the posture palette 1206/1208 can be used by the presenter to add various types of information content to the display screen of the public display device. As will be appreciated from the more detailed description that follows, this technique embodiment is advantageous since it eliminates having to use a toolbar on the public display device, which can result in the presenter having to walk in front of the public display device to reach distant commands.

As is exemplified in FIG. 12A, whenever a condition occurs where a presenter forms the palette generating posture 1202 and hovers this posture over the display screen 1204 of the public display device 1200 for the prescribed period of time, the skeletal tracking application running on the central computing device will operate cooperatively with the presenter-oriented object sensing device to identify this condition, the central computing device will enable a palette mode and will also display the posture palette 1206/1208 on the display screen of the public display device in a prescribed position thereon that is adjacent to the current location of this posture. In order to visually indicate to all the meeting attendees that the palette mode is active, the central computing device can optionally also display a colored (e.g., green) overlay (not shown) on the public display device 1200 in an area immediately surrounding the presenter, and can also optionally display a colored (e.g., red) shadow 1224 behind the palette generating posture 1202. The shadow 1224 can be implemented in various ways. In an exemplary embodiment of the information sharing democratization technique described herein the shadow 1224 is implemented as a semi-transparent overlay.

Generally speaking and referring again to FIG. 12A, the palette generating posture 1202 can be implemented using any type of posture that is recognizable by the combination of the audience-oriented object sensing device and skeletal tracking application, and is differentiable from the other postures described herein. By way of example but not limitation, in the particular technique embodiment exemplified in FIG. 12A the palette generating posture 1202 is implemented as a hand 1210 of the presenter having its palm open and all of its fingers 1212 spread apart. In the implementation of the information sharing democratization technique embodiment that is exemplified in FIG. 12A, the prescribed location is to the right of the palette generating posture 1202. It will be appreciated that other implementations (not shown) of this technique embodiment are also possible where the prescribed location is either above or to the left of the palette generating posture, among other places.

Referring again to FIG. 12A, the central computing device will remain in the palette mode and continue to display the posture palette 1206/1208 on the display screen 1204 of the public display device 1200 for as long as the presenter maintains the palette generating posture 1202 and hovers it over the display screen. Whenever the palette mode is enabled, the skeletal tracking application will track the position of the presenter and their palette generating posture 1202, and whenever the presenter or this posture moves, the skeletal tracking application will correspondingly move the posture palette 1206/1208, colored overlay immediately surrounding the presenter, and colored shadow 1224 behind palette generating posture 1202 on the public display device. This allows the presenter to reposition the posture palette 1206/1208 on the public display device 1200 as needed without having to touch the public display device (i.e., the presenter can move the posture palette closer to their other hand 1214 when needed and then move the posture palette away from their other hand when needed).

As exemplified in FIG. 12B, the presenter can use the posture palette 1206/1208 to add various items of information content to the public display device 1200 in the following manner. Each graphical icon in the posture palette 1206/1208 represents a different item of information content that the presenter may choose to add to the display screen 1204 of the public display device 1200. Whenever the palette mode is enabled and the presenter touches a particular graphical icon 1216 in the posture palette 1206 and then touch-drags this icon out of the posture palette and onto the display screen 1204 by performing a touch-dragging movement 1218 on the display screen, the central computing device will track the touch-dragging movement and display the particular information object 1220 that is associated with particular graphical icon on the display screen behind the current location of the touch-dragging movement. As exemplified in FIG. 12C, whenever the palette mode is enabled and another condition occurs where the presenter either stops forming the palette generating posture or stops hovering it over the display screen 1204 of the public display device 1200, the skeletal tracking application will operate cooperatively with the presenter-oriented object sensing device to identify this condition, and the central computing device will disable the palette mode and remove the posture palette from the display screen. Whenever the presenter stops performing the touch-dragging movement 1218 and removes their touch from the display screen 1204, the information object 1220 will continue to be displayed on the display screen.

It is noted that rather than the presenter bi-manually using the posture palette to add information content to the public display device as just described, an alternate embodiment of the information sharing democratization technique described herein is also possible where the presenter can uni-manually use the posture palette (i.e., with the same hand that is forming the palette generating posture). More particularly, after forming the palette generating posture using one hand and hovering this posture over the display screen as described heretofore, the presenter can then tap on the display screen using this same hand which will cause the posture palette to be pinned in a fixed position on the display screen where tap occurred. Once the posture palette is pinned, the presenter can then use this same hand to touch a particular graphical icon in the posture palette and touch-drag this icon out of the posture palette and onto the display screen as just described.

1.5.4 Posture-Moded Touch and Pen Gestures

Figure 13:
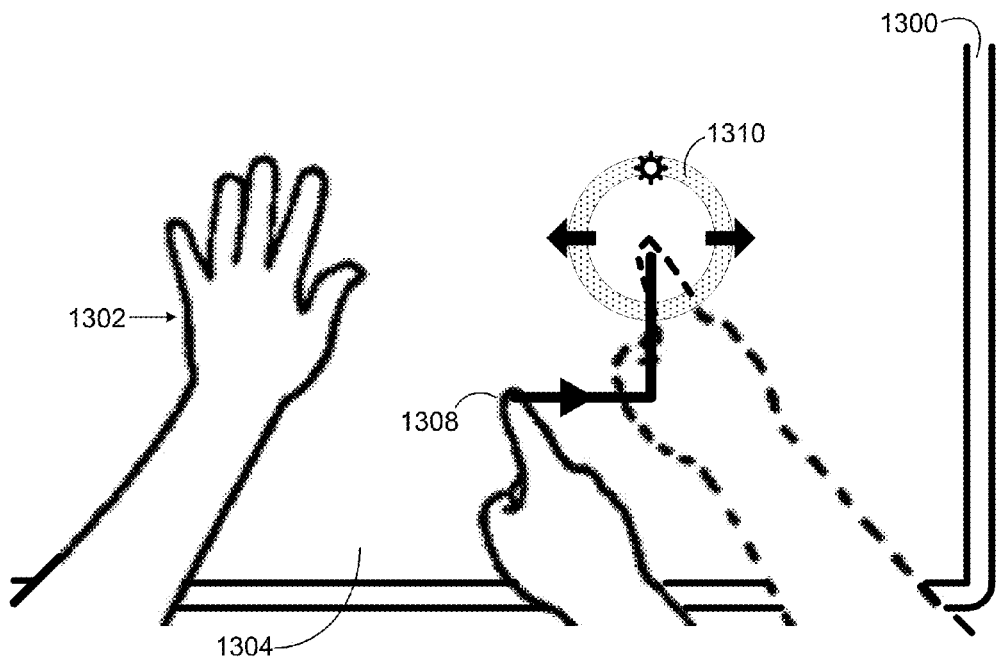
FIG. 13 is a diagram illustrating an exemplary embodiment, in simplified form, of an information sharing democratization technique for allowing a meeting presenter to control an explicit touch gesture mode on the touch-enabled public display device by using a prescribed posture.

FIG. 13 illustrates an exemplary embodiment, in simplified form, of an information sharing democratization technique for allowing a presenter to control an explicit touch gesture mode on the public display device by using a prescribed posture. As exemplified in FIG. 13, whenever a condition occurs where a presenter forms the palette generating posture 1302 and hovers this posture over the display screen 1304 of the public display device 1300 for the prescribed period of time and the central computing device enables the palette mode as described in the immediately preceding section, and whenever the presenter then touches 1308 a region of the display screen where nothing is currently being displayed, the following things will happen. The central computing device will remove the posture palette (not shown) from the public display device 1300 (after which the presenter can stop forming the palette generating posture 1302 or stop hovering it over the display screen 1304 of the public display device 1300). The central computing device will also disable the palette mode whenever the presenter stops touching the display screen 1304.

Referring again to FIG. 13, whenever the presenter touches 1308 the region of the display screen 1304 where nothing is currently being displayed and holds this touch without moving it on the display screen for a prescribed period of time (e.g., two seconds), the central computing device will display a conventional hierarchic marking menu 1310 which serves to guide the presenter through the various touch gestures that are allowed to be used on the display screen. Additionally, in the case where the presenter is already familiar with the various touch gestures that are allowed and wants to manipulate the information content that is currently displayed on the public display device 1300 rather than holding their touch 1308 on the display screen 1304, they can immediately continue to execute one of the allowed touch gestures on the display screen.

It is noted that rather than the presenter bi-manually initiating the palette mode and executing an allowed touch gesture on the display screen of the public display device as just described, an alternate embodiment of the information sharing democratization technique described herein is also possible where the presenter can uni-manually (i.e., with just a single hand) initiate the palette mode and execute an allowed touch gesture. More particularly, after forming the palette generating posture using one hand and hovering this posture over the display screen as described heretofore, the presenter can then use one or more fingers of the same hand to touch a region of the display screen where nothing is currently being displayed to either display the hierarchic marking menu or execute one of the allowed touch gestures on the display screen.

1.5.5 Workflow Templates

This section describes an exemplary embodiment of an information sharing democratization technique which allows meeting attendees to organize (e.g., sort, or categorize, or compare, among other activities) a set of information objects. As will be appreciated from the more detailed description that follows, this technique embodiment is advantageous in various group meeting scenarios such as the aforementioned project team group meetings which often involve assigning priorities to tasks, scheduling tasks, partitioning tasks among workers, and the like.

Figure 14:
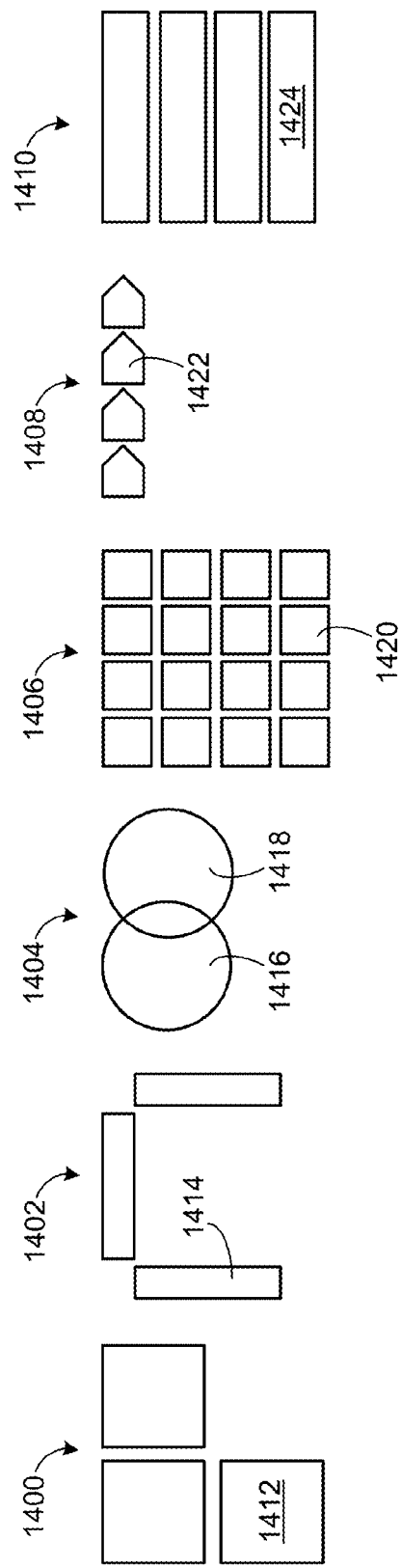
FIG. 14 is a diagram illustrating exemplary embodiments, in simplified form, of workflow templates which can be displayed on the public display device and used by meeting attendees to organize a set of information objects which are also displayed on this device.

FIG. 14 illustrates exemplary embodiments, in simplified form, of workflow templates which can be displayed on the public display device and used by the meeting attendees to organize a set of information objects which are also displayed on this device. As exemplified in FIG. 14, the workflow templates can include a three buckets template 1400, a peripheral buckets template 1402, a Venn diagram template 1404, a planning grid template 1406, a pipeline template 1408, and a parallel pipeline template 1410, among others. Each of these templates includes a plurality of visual buckets (e.g., 1412, 1414, 1416, 1418, 1420, 1422 and 1424) which are arranged in a different prescribed structure, where each bucket serves as a container into which a given information object can be placed using a touch-dragging gesture on the display screen of the public display device.

Figure 15C:
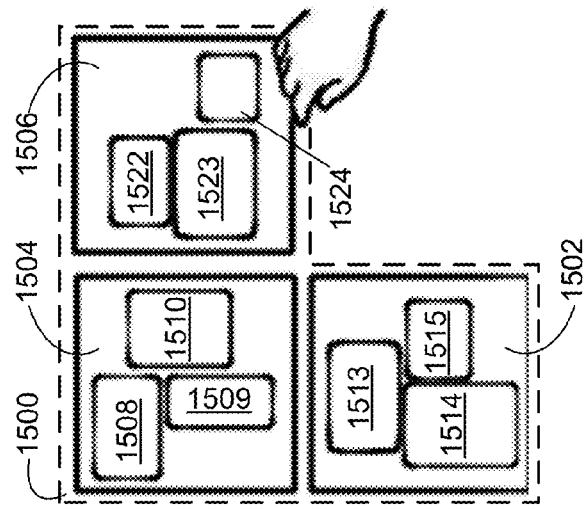
FIGS. 15A-15C are diagrams illustrating an exemplary embodiment, in simplified form, of an information sharing democratization technique for allowing a meeting presenter to use a three buckets template to organize the set of information objects.
Figure 15B:
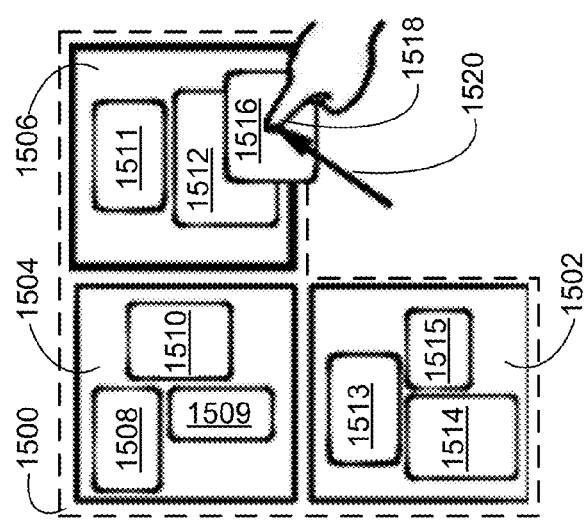
Figure 15A:
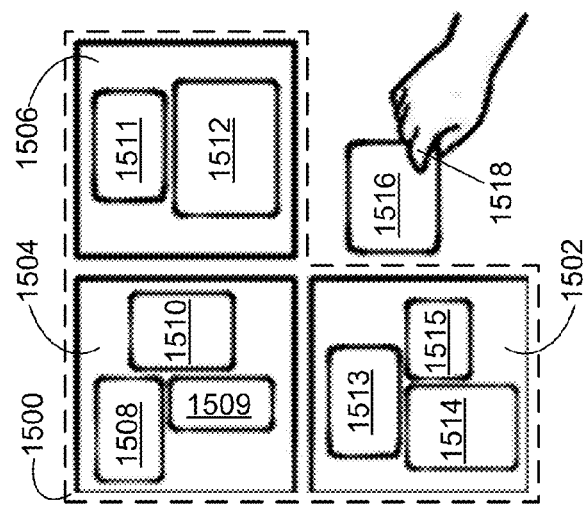

FIGS. 15A-15C illustrate an exemplary embodiment, in simplified form, of an information sharing democratization technique for allowing a presenter to use the three buckets template to organize a set of information objects which are displayed on the public display device. More particularly, FIG. 15A, illustrates a situation where the three buckets template 1500 is displayed on the public display device (not shown) and the presenter has already moved a plurality of information objects into each of the three buckets (i.e., the presenter has already moved information objects 1508-1510 into bucket 1504, information objects 1511 and 1512 into bucket 1505, and information objects 1513-1515 into bucket 1502). As exemplified in FIGS. 15A-15C, whenever the presenter touches 1518 an information object 1516 that is displayed on the public display device but is not currently in a bucket, and the presenter then touch-drags 1520 this information object into a desired bucket 1506, the gesture identification application that is running on the central computing device will identify this touch-dragging activity, a screen layout application that is also running on the central computing device will automatically resize this information object and any information objects that were previously in the desired bucket 1511 and 1512 so that they all fit in the desired bucket, and the central computing device will display these resized information objects 1522-1524 within the desired bucket.

It will be appreciated that the presenter can also use touch-dragging gestures on the display screen of the public display device to move a given information object from one bucket to another, or move a given information object out of a bucket it is current in and back onto the display screen workspace (at which point the information object will return to its original size). The presenter can also use touch gestures to zoom in on a specific bucket to examine its contents in greater detail. It will also be appreciated that in addition to the presenter being the one who performs the organization and other information object manipulation activities described in this section, an audience member can also remotely perform these organization and manipulation activities.

1.6 Process Framework

Figure 16:
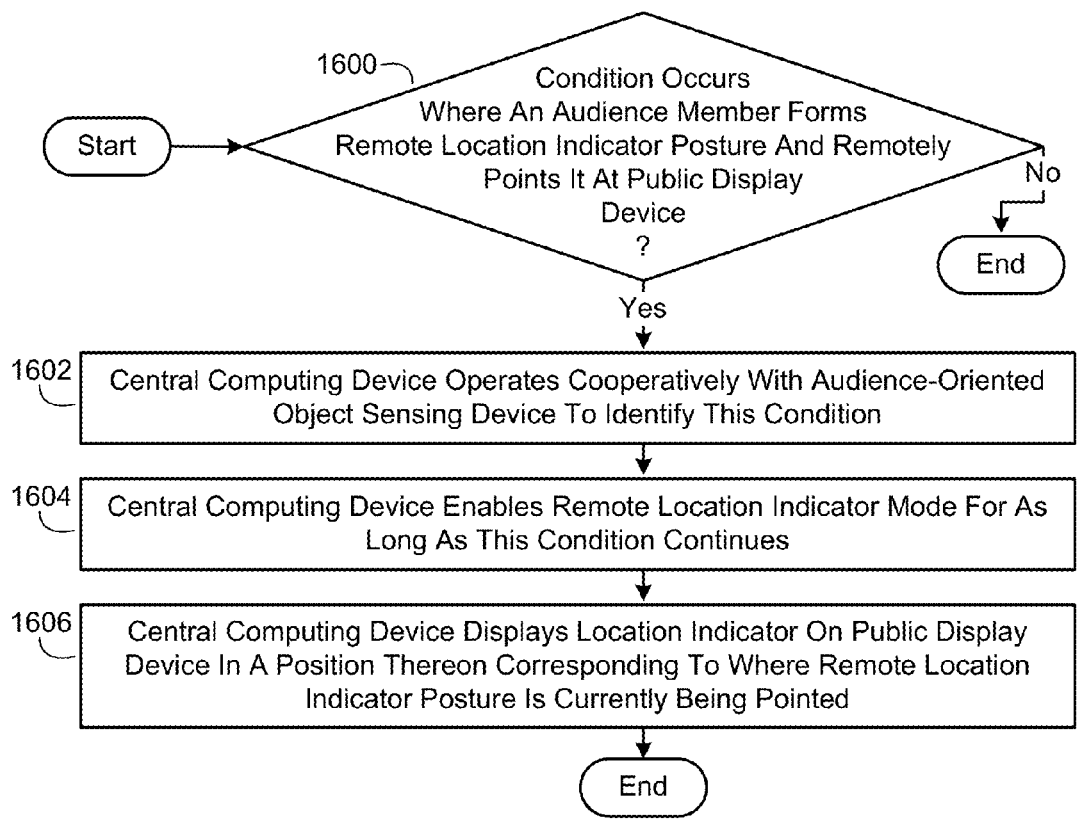
FIG. 16 is a flow diagram illustrating one embodiment, in simplified form, of a process for democratizing information sharing during a co-located group meeting in a meeting space.

FIG. 16 illustrates one embodiment, in simplified form, of a process for democratizing information sharing during a co-located group meeting in a meeting space. As exemplified in FIG. 16, the process starts in block 1600 with a condition occurring where an audience member forms the remote location indicator posture and remotely points it at the public display device. The central computing device then operates cooperatively with the audience-oriented object sensing device to identify this condition (block 1602). The central computing device then enables the remote location indicator mode for as long as this condition continues (block 1604), and displays the location indicator on the public display device in a position thereon corresponding to where the remote location indicator posture is currently being pointed.

Figure 17:
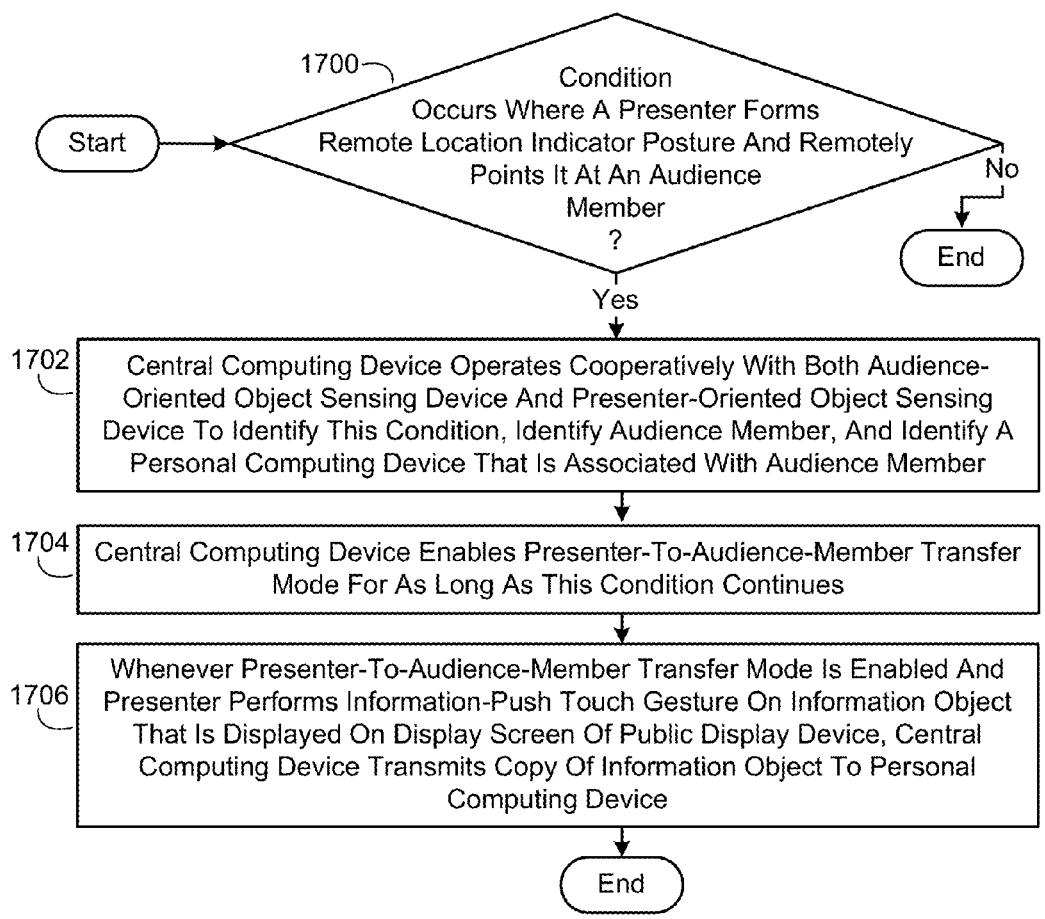
FIG. 17 is a flow diagram illustrating another embodiment, in simplified form, of a process for democratizing information sharing during a co-located group meeting in a meeting space.

FIG. 17 illustrates another embodiment, in simplified form, of a process for democratizing information sharing during a co-located group meeting in a meeting space. As exemplified in FIG. 17, the process starts in block 1700 with a condition occurring where a presenter forms the remote location indicator posture and remotely points it at an audience member. The central computing device then operates cooperatively with both the audience-oriented object sensing device and the presenter-oriented object sensing device to identify this condition, identify the audience member, and identify a personal computing device that is associated with the audience member (block 1702). The central computing device then enables the presenter-to-audience-member transfer mode for as long as this condition continues (block 1704). Then, whenever the presenter-to-audience-member transfer mode is enabled and the presenter performs the information-push touch gesture on an information object that is displayed on the display screen of the public display device, the central computing device will transmit a copy of the information object to the personal computing device that is associated with the audience member (block 1706).

Figure 18A:
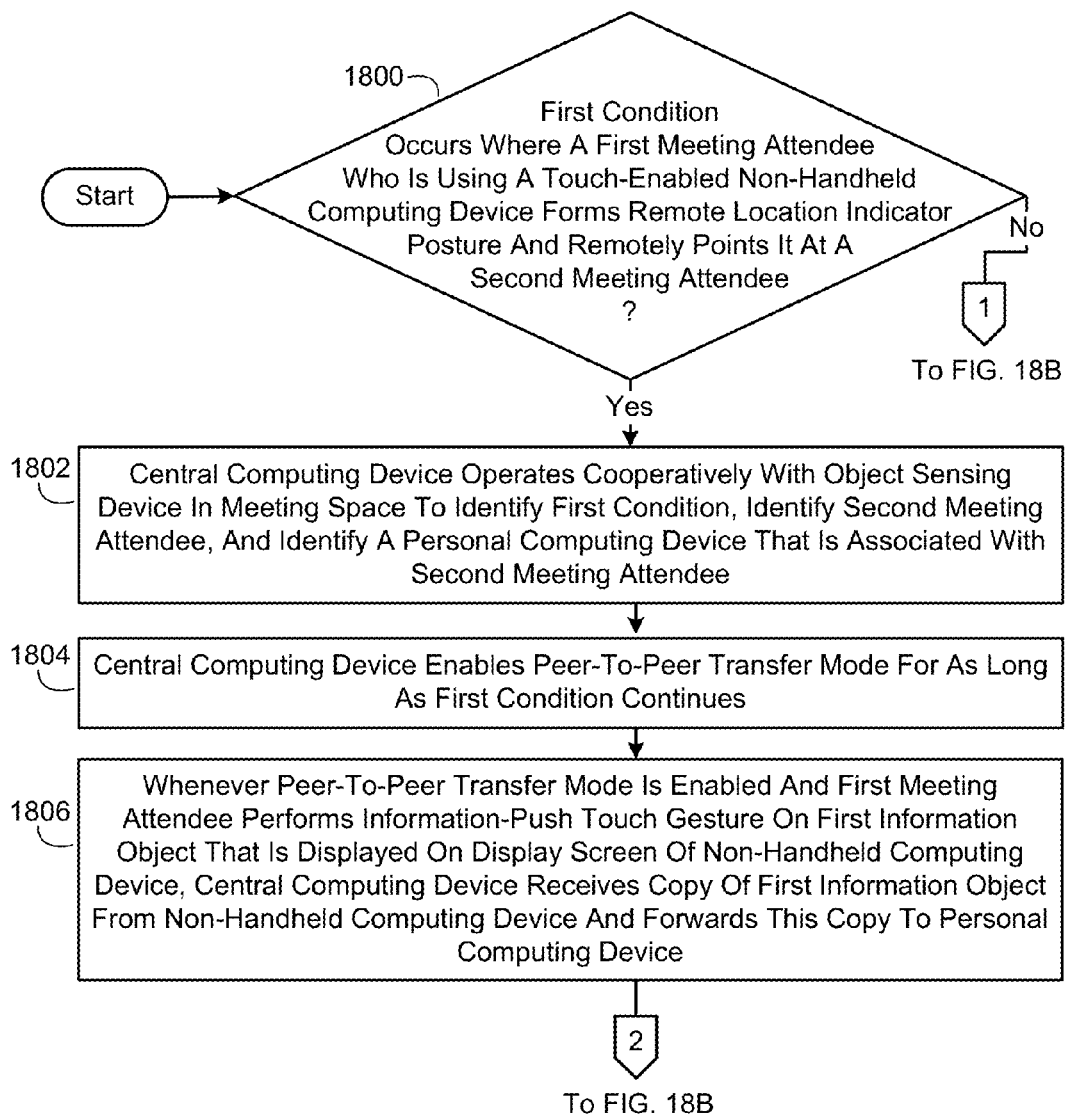
FIGS. 18A and 18B are flow diagrams illustrating yet another embodiment, in simplified form, of a process for democratizing information sharing during a co-located group meeting in a meeting space.
Figure 18B:
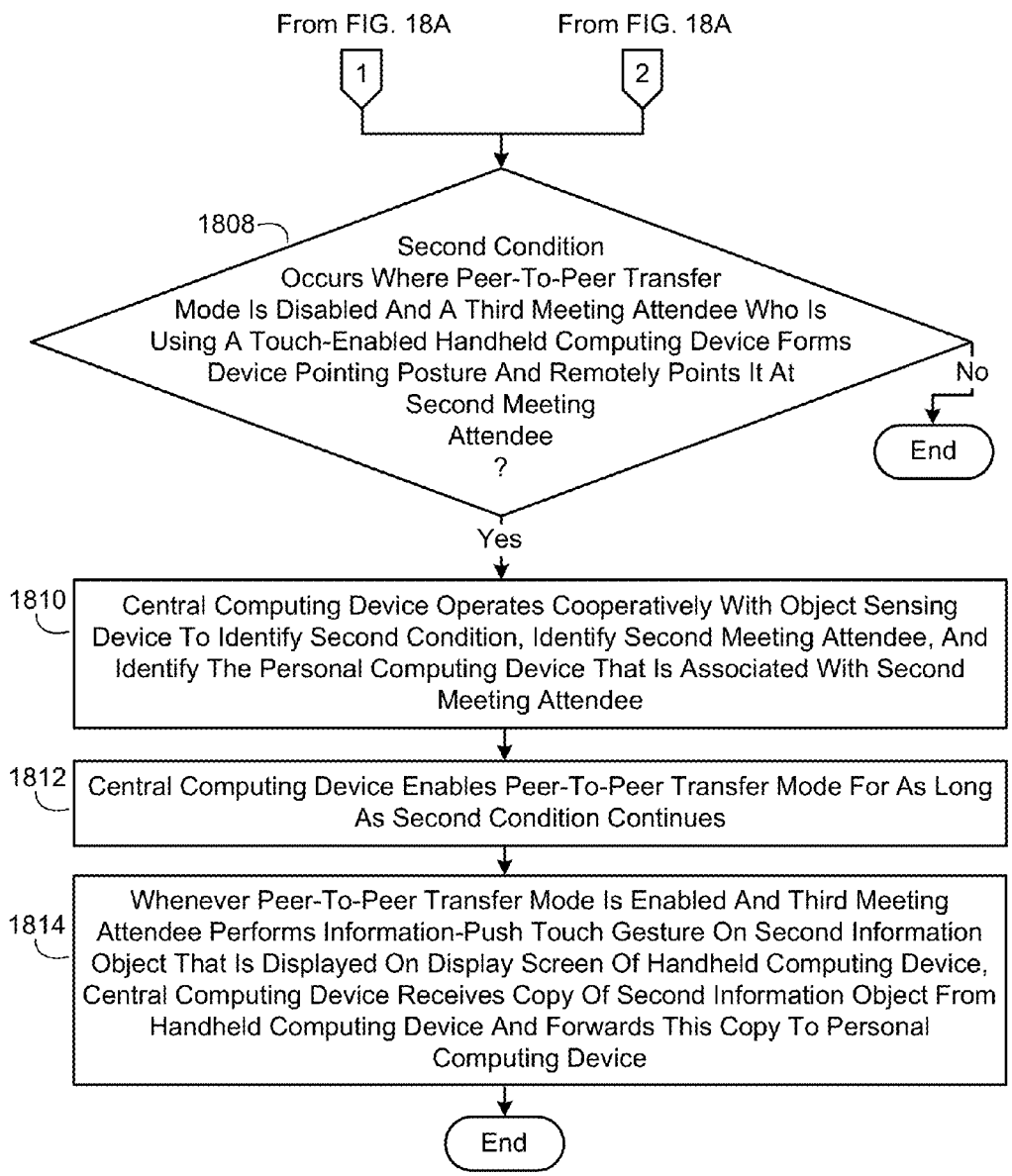

FIGS. 18A and 18B illustrate yet another embodiment, in simplified form, of a process for democratizing information sharing during a co-located group meeting in a meeting space. As exemplified in FIG. 18A, the process starts in block 1800 with a first condition occurring where a first meeting attendee who is using a touch-enabled non-handheld computing device forms the remote location indicator posture and remotely points it at a second meeting attendee. The central computing device then operates cooperatively with an object sensing device in the meeting space to identify this first condition, identify the second meeting attendee, and identify the personal computing device that is associated with the second meeting attendee (block 1802). The central computing device then enables the peer-to-peer transfer mode for as long as this first condition continues (block 1804). Then, whenever the peer-to-peer transfer mode is enabled and the first meeting attendee performs the information-push touch gesture on a first information object that is displayed on the display screen of the non-handheld computing device, the central computing device will receive a copy of the first information object from the non-handheld computing device and forward this copy to the personal computing device (block 1806).

As exemplified in FIG. 18B, whenever a second condition occurs where the peer-to-peer transfer mode is disabled and a third meeting attendee who is using a touch-enabled handheld computing device forms the device pointing posture and remotely points it at the second meeting attendee (block 1808), the central computing device will operate cooperatively with the object sensing device to identify this second condition, identify the second meeting attendee, and identify the personal computing device that is associated with the second meeting attendee (block 1810). The central computing device then enables the peer-to-peer transfer mode for as long as this second condition continues (block 1812). Then, whenever the peer-to-peer transfer mode is enabled and the third meeting attendee performs the information-push touch gesture on a second information object that is displayed on the display screen of the handheld computing device, the central computing device will receive a copy of the second information object from the handheld computing device and forward this copy to the personal computing device (block 1814).

2.0 Additional Embodiments

While the information sharing democratization technique has been described by specific reference to embodiments thereof, it is understood that variations and modifications thereof can be made without departing from the true spirit and scope of the information sharing democratization technique. By way of example but not limitation, in addition to the various touch gesture disclosure overlays described heretofore, an alternate embodiment of the information sharing democratization technique described herein is also possible where an online learning system (such as the conventional GestureBar user interface for learning gestural interactions, among others) can implemented to disclose the various touch gestures and in-air gestures that are allowed to be performed. A given presenter or audience member who initiates one of the information sharing operations describe herein can also be provided with haptic feedback when the sharing operation is successfully completed, where the nature of this feedback is adapted to the characteristics of the particular device the presenter or audience member initiated the sharing operation from. The object sensing devices can also be implemented in ways other than those described heretofore. By way of example but not limitation, the object sensing devices can be implemented using the "Peanut" ultra-low-power, short-range wireless radio technology configured to operate in a triangulation mode. This particular implementation is advantageous in that the radio signals generally won't pass through walls or other obstructions, so that the space being sensed by the object sensing devices will correspond to the physical dimensions of the meeting space.

Another alternate embodiment of the information sharing democratization technique described herein is also possible where a large meeting space includes a plurality of public display devices. In this technique embodiment a different presenter-oriented object sensing device can be paired with each public display device so that the current physical location of any presenters who are adjacent to each public display device can be identified, and the in-air gestures performed by and postures formed by such presenters can also be identified. The touch gesture disclosure overlay that is displayed on the display screen of the touch-enabled handheld computing device can disclose a second spatial operand which allows the audience member that is operating this device to select which of the public display devices to control. A different optical projection device can also be paired with each public display device. Yet another alternate embodiment of the information sharing democratization technique described herein is also possible where a large meeting space includes a plurality of audience-oriented object sensing devices in order to support the identification of the current physical location of the audience members, and the identification of the in-air gestures performed by the audience members, and the identification of the postures formed by the audience members, among other things.

It is also noted that any or all of the aforementioned embodiments can be used in any combination desired to form additional hybrid embodiments. Although the information sharing democratization technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Computing Environment

Figure 19:
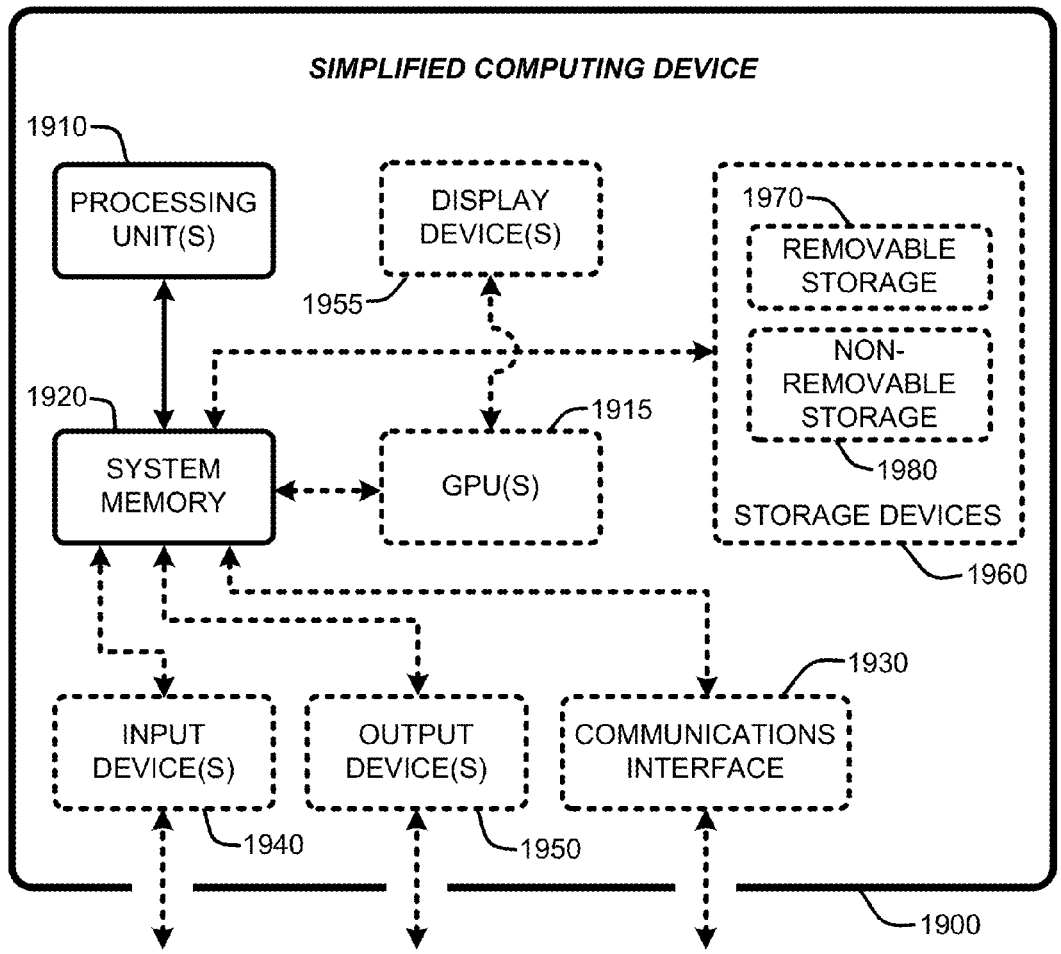
FIG. 19 is a diagram illustrating a simplified example of a general-purpose computer system on which various embodiments and elements of the information sharing democratization technique, as described herein, may be implemented.

The information sharing democratization technique embodiments described herein are operational within numerous types of general purpose or special purpose computing system environments or configurations. FIG. 19 illustrates a simplified example of a general-purpose computer system on which various embodiments and elements of the information sharing democratization technique, as described herein, may be implemented. It should be noted that any boxes that are represented by broken or dashed lines in FIG. 19 represent alternate embodiments of the simplified computing device, and that any or all of these alternate embodiments, as described below, may be used in combination with other alternate embodiments that are described throughout this document.

For example, FIG. 19 shows a general system diagram showing a simplified computing device 1900. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the information sharing democratization technique embodiments described herein, the device should have a sufficient computational capability and system memory to enable basic computational operations. In particular, as illustrated by FIG. 19, the computational capability is generally illustrated by one or more processing unit(s) 1910, and may also include one or more graphics processing units (GPUs) 1915, either or both in communication with system memory 1920. Note that that the processing unit(s) 1910 may be specialized microprocessors (such as a digital signal processor (DSP), a very long instruction word (VLIW) processor, or other micro-controller) or can be conventional central processing units (CPUs) having one or more processing cores including, but not limited to, specialized GPU-based cores in a multi-core CPU.

In addition, the simplified computing device of FIG. 19 may also include other components, such as, for example, a communications interface 1930. The simplified computing device of FIG. 19 may also include one or more conventional computer input devices 1940 (e.g., pointing devices, keyboards, audio input devices, video input devices, haptic input devices, devices for receiving wired or wireless data transmissions, and the like). The simplified computing device of FIG. 19 may also include other optional components, such as, for example, one or more conventional computer output devices 1950 (e.g., display device(s) 1955, audio output devices, video output devices, devices for transmitting wired or wireless data transmissions, and the like). Note that typical communications interfaces 1930, input devices 1940, output devices 1950, and storage devices 1960 for general-purpose computers are well known to those skilled in the art, and will not be described in detail herein.

The simplified computing device of FIG. 19 may also include a variety of computer readable media. Computer readable media can be any available media that can be accessed by computer 1900 via storage devices 1960, and includes both volatile and nonvolatile media that is either removable 1970 and/or non-removable 1980, for storage of information such as computer-readable or computer-executable instructions, data structures, program modules, or other data. By way of example but not limitation, computer readable media may include computer storage media and communication media. Computer storage media includes, but is not limited to, computer or machine readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of the any of the above should also be included within the scope of communication media.

Furthermore, software, programs, and/or computer program products embodying the some or all of the various embodiments of the information sharing democratization technique described herein, or portions thereof, may be stored, received, transmitted, or read from any desired combination of computer or machine readable media or storage devices and communication media in the form of computer executable instructions or other data structures.

Finally, the information sharing democratization technique embodiments described herein may be further described in the general context of computer-executable instructions, such as program modules, being executed by a computing device. Generally, program modules include routines, programs, objects, components, data structures, and the like, that perform particular tasks or implement particular abstract data types. The information sharing democratization technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Wherefore, what is claimed is:

1. A computer-implemented process for democratizing information sharing during a co-located group meeting in a meeting space, comprising:
 using a computer to performing the following process actions:
 whenever a first condition occurs comprising a first meeting attendee who is within a first prescribed distance of a public display device comprising a touch-enabled display screen in the meeting space forming a remote location indicator posture and remotely pointing said posture at a second meeting attendee who is not within the prescribed distance of the public display device,
  operating cooperatively with both an audience-oriented object sensing device in the meeting space, and a presenter-oriented object sensing device in the meeting space, to identify the first condition, identify the second meeting attendee, and identify a personal computing device that is associated with the second meeting attendee, and
  enabling a presenter-to-audience-member transfer mode for as long as the first condition continues; and
 whenever the presenter-to-audience-member transfer mode is enabled and the first meeting attendee performs an information-push touch gesture on an information object that is displayed on the display screen, transmitting a copy of said information object to said personal computing device.

2. The process of claim 1, wherein the first meeting attendee forms the remote location indicator posture using one of their hands, further comprising the actions of, whenever the presenter-to-audience-member transfer mode is enabled and a second condition occurs comprising the first condition continuing for a prescribed period of time and the other hand of the first meeting attendee being within a second prescribed distance of the display screen,
 operating cooperatively with both the audience-oriented and presenter-oriented object sensing devices to identify the second condition, and
 displaying a touch gesture disclosure overlay around the first meeting attendee on the public display device, said overlay comprising one or more different graphical icons each of which discloses a different rectilinear, mark-based touch gesture that is allowed to be performed by the first meeting attendee on the display screen.

3. The process of claim 2, further comprising the actions of:
 whenever a third condition occurs comprising the first meeting attendee forming the remote location indicator posture and remotely pointing it away from the public display device and at a floor of the meeting space,
  operating cooperatively with both the audience-oriented and presenter-oriented object sensing devices to identify the third condition, identify any meeting attendees who are not within the first prescribed distance of the public display device, and identify the personal computing device that is associated with each of said attendees, and
  enabling a presenter-to-entire-audience transfer mode for as long as the third condition continues; and
 whenever the presenter-to-entire-audience transfer mode is enabled and the first meeting attendee performs the information-push touch gesture on the information object that is displayed on the display screen, transmitting a copy of said information object to the personal computing device that is associated with each of the meeting attendees who are not within the first prescribed distance of the public display device.

4. The process of claim 2, wherein the touch gesture disclosure overlay further comprises text that is displayed alongside each of the different graphical icons, said text disclosing a particular action or command that is associated with the rectilinear, mark-based touch gesture that is disclosed by each of the different graphical icons.

5. The process of claim 1, further comprising the actions of, whenever a second condition occurs comprising there being no meeting attendees in the meeting space,
 operating cooperatively with the audience-oriented and presenter-oriented object sensing devices to identify the second condition,
 enabling an ambient display mode for as long as the second condition continues, and
 displaying one or more default information objects on the public display device.

6. The process of claim 5, further comprising the actions of, whenever the ambient display mode is enabled and a third condition occurs comprising one or more meeting attendees entering and remaining in the meeting space for a prescribed period of time,
 operating cooperatively with the audience-oriented and presenter-oriented object sensing devices to identify the third condition,
 disabling the ambient display mode, and
 removing the default information objects from the public display device.

7. The process of claim 5, wherein the default information objects comprise a calendar for group meetings that are scheduled in the meeting space.

8. The process of claim 5, further comprising the actions of, whenever the ambient display mode is enabled and a third condition occurs comprising one or more meeting attendees entering the meeting space and performing either an allowed touch gesture or an allowed in-air gesture on the display screen,
 operating cooperatively with the audience-oriented and presenter-oriented object sensing devices to identify the third condition,
 disabling the ambient display mode, and
 removing the default information objects from the public display device.

9. The process of claim 1, further comprising the actions of:
 whenever a second condition occurs comprising there being two or more meeting attendees within the first prescribed distance of the public display device and said attendees are facing toward the public display device enough to see its contents,
  operating cooperatively with the presenter-oriented object sensing device to identify the second condition, enabling a multi-working presenters mode for as long as the second condition continues, and segmenting the display screen into a number of different regions, said number equaling a current count of the two or more meeting attendees, each different region being positioned in front of a different one of the two or more meeting attendees, and a splitter graphical element being displayed between adjacent regions.

10. The process of claim 1, further comprising the actions of, whenever a second condition occurs comprising the first meeting attendee forming the remote location indicator posture and pointing said posture at a tertiary display region which is optically projected onto a prescribed location on a tertiary surface in the meeting space that is located near the public display device, operating cooperatively with the presenter-oriented object sensing device to identify the second condition, enabling a tertiary display mode for as long as the second condition continues, and causing an optical projection device in the meeting space to optically project a location indicator within said region in a position there-within corresponding to where said posture is currently being pointed.

11. The process of claim 10, further comprising the actions of, whenever the tertiary display mode is enabled and the first meeting attendee performs the information-push touch gesture on the information object that is displayed on the display screen, causing the optical projection device to optically project said information object within the tertiary display region, and removing said information object from the public display device.

12. The process of claim 1, further comprising the actions of, whenever a second condition occurs comprising the first meeting attendee facing away from the public display device and being the only meeting attendee who is within the first prescribed distance of the public display device, operating cooperatively with the presenter-oriented object sensing device to identify the second condition, enabling a single-speaking-presenter mode for as long as the second condition continues, and hiding all user interface elements that are currently being displayed on the public display device that specifically support the first meeting attendee.

13. The process of claim 1, further comprising the actions of:

whenever a second condition occurs comprising the first meeting attendee forming a palette generating posture and hovering said posture over the display screen for a prescribed period of time, operating cooperatively with the presenter-oriented object sensing device to identify the second condition, enabling a palette mode for as long as the second condition continues, and displaying a posture palette on the display screen in a position thereon that is adjacent to the current location of said posture, the posture palette comprising a palette of graphical icons, each of said icons representing a different item of information content that the first meeting attendee may choose to add to the display screen.

14. The process of claim 13, wherein the action of displaying a posture palette on the display screen in a position thereon that is adjacent to the current location of said posture comprises one or more of the actions of:

displaying a colored overlay on the public display device in an area immediately surrounding the first meeting attendee in order to visually indicate to all meeting attendees that the palette mode is active; or displaying a colored shadow behind the palette generating posture in order to visually indicate to all meeting attendees that the palette mode is active.

15. The process of claim 14, further comprising the actions of:

whenever the palette mode is enabled, tracking the position of the first meeting attendee and their palette generating posture;

whenever the first meeting attendee moves, moving the colored overlay accordingly; and whenever the palette generating posture moves, moving the posture palette and colored shadow accordingly.

16. The process of claim 13, further comprising the actions of, whenever the first meeting attendee touch-drags a particular graphical icon out of the posture palette and onto the display screen by performing a touch-dragging movement on the display screen, tracking the touch-dragging movement, and displaying the item of information content that is represented by said particular graphical icon on the display screen behind the current location of the touch-dragging movement.

17. A system for democratizing information sharing during a co-located group meeting in a meeting space, comprising:

a public display device comprising a touch-enabled display screen in the meeting space;

an audience-oriented object sensing device in the meeting space;

a presenter-oriented object sensing device in the meeting space;

one or more computing devices, said computing devices being in communication with the public display device and the audience-oriented and presenter-oriented object sensing devices via a computer network, said computing devices also being in communication with each other via the computer network whenever there is a plurality of computing devices; and a computer program having program modules executable by the one or more computing devices, the one or more computing devices being directed by the program modules of the computer program to, whenever a first condition occurs comprising a first meeting attendee who is within a first prescribed distance of the public display device forming a remote location indicator posture and remotely pointing said posture at a second meeting attendee who is not within the prescribed distance of the public display device, operate cooperatively with both the audience-oriented and presenter-oriented object sensing devices to identify the first condition, identify the second meeting attendee, and identify a personal computing device that is associated with the second meeting attendee, and enable a presenter-to-audience-member transfer mode for as long as the first condition continues, and whenever the presenter-to-audience-member transfer mode is enabled and the first meeting attendee performs an information-push touch gesture on an information object that is displayed on the display screen, transmit a copy of said information object to said personal computing device.

18. A computer-implemented process for democratizing information sharing during a co-located group meeting in a meeting space, comprising:
using a computer to performing the following process actions:
whenever a first condition occurs comprising a first meeting attendee who is using a touch-enabled non-handheld computing device forming a remote location indicator posture and remotely pointing said posture at a second meeting attendee,
operating cooperatively with an object sensing device in the meeting space to identify the first condition, identify the second meeting attendee, and identify a personal computing device that is associated with the second meeting attendee, and
enabling a peer-to-peer transfer mode for as long as the first condition continues; and
whenever the peer-to-peer transfer mode is enabled and the first meeting attendee performs an information-push touch gesture on a first information object that is displayed on a display screen of the non-handheld computing device,
receiving a copy of the first information object from the non-handheld computing device, and
forwarding the copy of the first information object to said personal computing device.

19. The process of claim 18, further comprising the actions of:
whenever a second condition occurs comprising the peer-to-peer transfer mode being disabled and a third meeting attendee who is using a touch-enabled handheld computing device forming a device pointing posture and remotely pointing said posture at the second meeting attendee,
operating cooperatively with the object sensing device to identify the second condition, identify the second meeting attendee, and identify the personal computing device that is associated with the second meeting attendee, and
enabling the peer-to-peer transfer mode for as long as the second condition continues; and
whenever the peer-to-peer transfer mode is enabled and the third meeting attendee performs the information-push touch gesture on a second information object that is displayed on a display screen of the handheld computing device,
receiving a copy of the second information object from the handheld computing device, and
forwarding the copy of the second information object to said personal computing device.

20. The process of claim 18, wherein the object sensing device comprises either:
an infrared projector combined with an infrared camera that is matched to the infrared projector; or
an ultrasound transmitter combined with an ultrasound receiver that is matched to the ultrasound transmitter; or
a pair of visible light video cameras which operate together as a stereo video camera; or
a single visible light video camera.

\* \* \* \* \*